US010183533B2

(12) United States Patent
Washizuka et al.

(10) Patent No.: US 10,183,533 B2
(45) Date of Patent: Jan. 22, 2019

(54) HEAVY-DUTY TIRE

(71) Applicant: SUMITOMO RUBBER INDUSTRIES, LTD., Kobe-shi, Hyogo (JP)

(72) Inventors: Masakazu Washizuka, Kobe (JP); Makoto Igarashi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 164 days.

(21) Appl. No.: 15/030,308

(22) PCT Filed: Oct. 8, 2014

(86) PCT No.: PCT/JP2014/076993
§ 371 (c)(1),
(2) Date: Apr. 18, 2016

(87) PCT Pub. No.: WO2015/068520
PCT Pub. Date: May 14, 2015

(65) Prior Publication Data
US 2016/0272010 A1    Sep. 22, 2016

(30) Foreign Application Priority Data

Nov. 7, 2013   (JP) ................... 2013-231421
Feb. 10, 2014  (JP) ................... 2014-023582
May 28, 2014   (JP) ................... 2014-110471

(51) Int. Cl.
*B60C 11/03*     (2006.01)
*B60C 11/11*     (2006.01)
*B60C 11/13*     (2006.01)

(52) U.S. Cl.
CPC .......... *B60C 11/0309* (2013.01); *B60C 11/03* (2013.01); *B60C 11/033* (2013.01);
(Continued)

(58) Field of Classification Search
CPC ............ B60C 11/0306; B60C 11/0327; B60C 11/033; B60C 2011/0337;
(Continued)

(56) References Cited

U.S. PATENT DOCUMENTS 4,515,197 A * 5/1985 Motomura .......... B60C 11/0306
                                                 152/209.21
5,031,680 A * 7/1991 Kajikawa ................ B60C 11/11
                                                 152/209.18
(Continued)

FOREIGN PATENT DOCUMENTS

JP    04-87807 A        3/1992
JP    2001-219714 A     8/2001
(Continued)

OTHER PUBLICATIONS

Kiyoto Maruoka, JP 2004-224131, machine translation (Year: 2004).*
(Continued)

*Primary Examiner* — Robert C Dye
*Assistant Examiner* — Sedef E Paquette
(74) *Attorney, Agent, or Firm* — Birch, Stewart, Kolasch & Birch, LLP

(57) ABSTRACT

The present disclosure relates to a heavy-duty tire compatible with wear resistance, uneven wear resistance, and wet performance. In the present disclosure, by providing, to a tread section, a pair of center primary grooves, a pair of shoulder primary grooves, a plurality of center lateral grooves, a plurality of middle lateral grooves, and a plurality of shoulder lateral grooves, the tread section is divided into a center block, a middle block, and a shoulder block.

20 Claims, 22 Drawing Sheets

(52) U.S. Cl.
CPC ........... *B60C 11/0306* (2013.01); *B60C 11/11* (2013.01); *B60C 11/1307* (2013.01); *B60C 2011/0346* (2013.01); *B60C 2011/0353* (2013.01); *B60C 2011/0358* (2013.01); *B60C 2011/0367* (2013.01); *B60C 2011/0372* (2013.01); *B60C 2011/133* (2013.01); *B60C 2200/06* (2013.01)

(58) Field of Classification Search
CPC ......... B60C 2011/0346; B60C 2200/06; B60C 2200/065; B60C 2200/08; B60C 11/03; B60C 11/0302; B60C 11/0309; B60C 2011/0369; B60C 2011/0381
USPC .................................................... 152/209.18
See application file for complete search history.

(56) References Cited

U.S. PATENT DOCUMENTS

| | | | |
|---|---|---|---|
| 6,736,175 B2* | 5/2004 | Carra | ...................... B60C 11/11 |
| | | | 152/209.18 |
| 2009/0090445 A1* | 4/2009 | Itou | ...................... B60C 11/0306 |
| | | | 152/209.25 |
| 2010/0096055 A1 | 4/2010 | Shibano | |
| 2012/0006456 A1* | 1/2012 | Koshio | ................... B60C 11/11 |
| | | | 152/209.18 |
| 2012/0241061 A1 | 9/2012 | Maehara | |

FOREIGN PATENT DOCUMENTS

| | | | |
|---|---|---|---|
| JP | 2004-224131 A | | 8/2004 |
| JP | 2004224131 A | * | 8/2004 |
| JP | 2010-095196 A | | 4/2010 |
| JP | 2011-195045 A | | 10/2011 |
| JP | 2012-201253 A | | 10/2012 |
| WO | WO 2010/084988 A1 | | 7/2010 |

OTHER PUBLICATIONS

International Search Report issued in PCT/JP2014/076993 dated Jan. 6, 2015.
Extended European Search Report, dated May 8, 2017, for European Application No. 14859708.1.
Extended European Search Report, dated Aug. 16, 2018 for European Application No. 18171264.7.

* cited by examiner

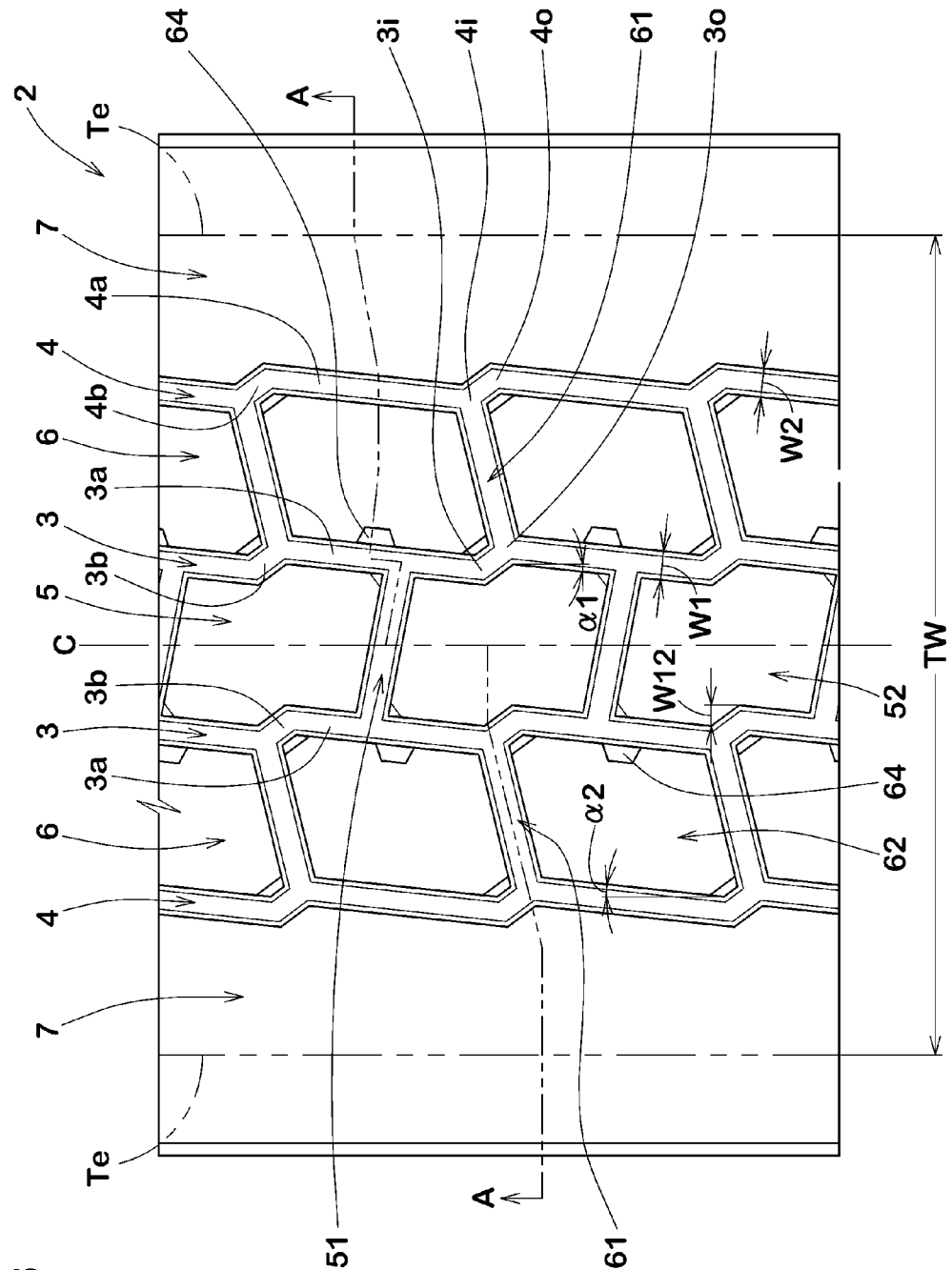

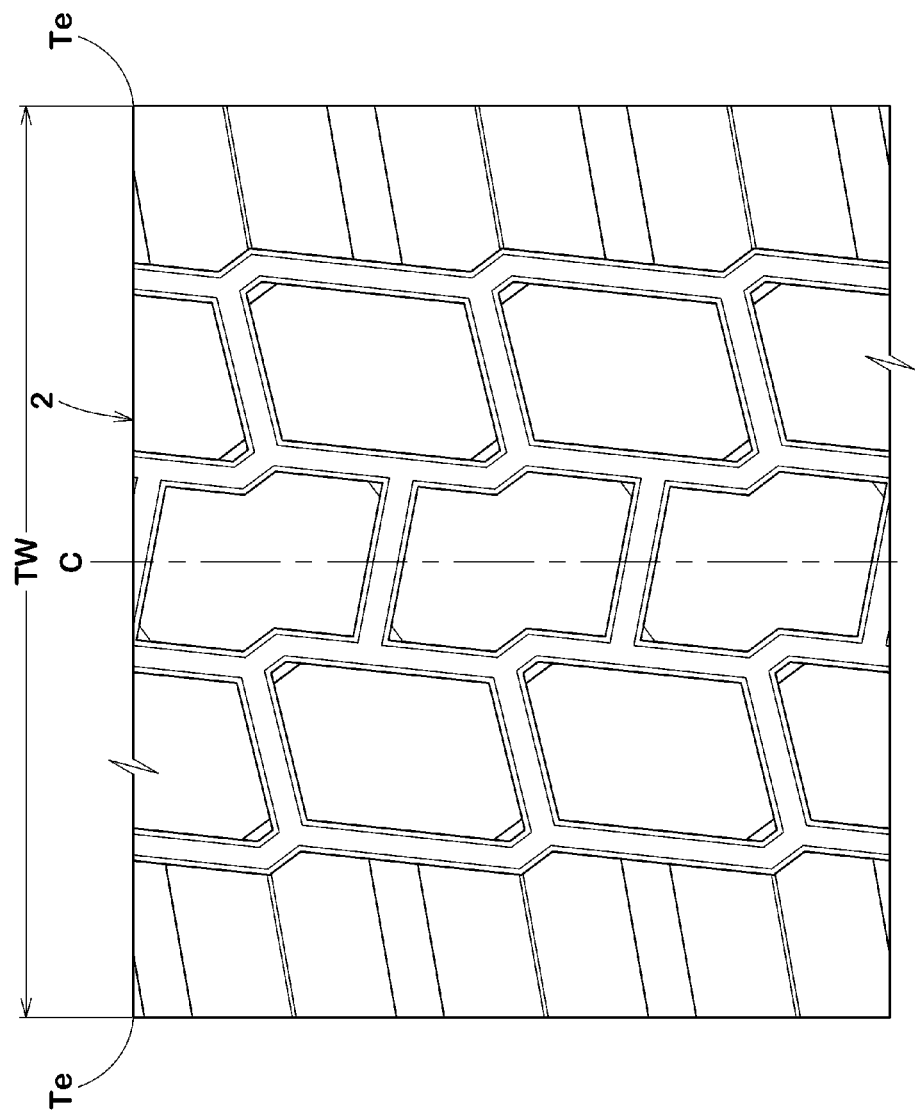

HEAVY-DUTY TIRE

TECHNICAL FIELD

The present invention relates to a heavy-duty tire compatible with wear resistance, uneven wear resistance and wet performance.

BACKGROUND ART

Conventionally, the following Patent Document 1 has proposed a tread pattern for heavy-duty tires used for trucks and buses, the tread pattern being provided with a plurality of circumferentially and continuously extending main grooves and a plurality of lateral grooves each extending between the main grooves as well as between one of the main grooves and a tread edge to form a plurality of tread blocks, for example.

The heavy-duty tires are required excellent wear resistance and uneven wear resistance, in view of economics and saving maintenance. In general, in order to improve the wear resistance and uneven wear resistance, it may be effective to increase the rigidity of the tread portion while ensuring a sufficient rubber volume of the tread portion by decreasing the groove volume of the tread portion.

CITATION LIST

Patent Literature

Patent Document 1: Japanese Unexamined Patent Application Publication No. 2011-195045

Unfortunately, when reducing the groove volume of the tread portion, the drainage property is lowered, thereby deteriorating the wet performance.

SUMMARY OF INVENTION

Technical Problem

The present invention has been made in view of circumstances as described above, and has a main object to provide a heavy-duty tire compatible with wear resistance, uneven wear resistance and wet performance at a high level.

Solution to Problem

The present invention provides a heavy-duty tire including a tread portion being provided with a pair of circumferentially and continuously extending zigzag central main grooves arranged on both sides of a tire equator, a pair of circumferentially and continuously extending zigzag shoulder main grooves each arranged between one of the central main grooves and one of tread edges, a plurality of central lateral grooves connecting the pair of central main grooves and a plurality of middle lateral grooves connecting the central main groove with the shoulder main groove on both sides of the tire equator, thereby the tread portion including a central land portion in which a plurality of central blocks separated by the pair of central main grooves and the central lateral grooves are arranged in a circumferential direction of the tire, a pair of middle land portions in which a plurality of middle blocks separated by one of the central main grooves, one of the shoulder main grooves and the middle lateral grooves are arranged in a circumferential direction of the tire, and a pair of shoulder land portions separated between one of the shoulder main grooves and one of the tread edges, each of the central main grooves and the shoulder main grooves including a long side and a short side arranged alternately in a circumferential direction of the tire wherein the short side is inclined in an opposite direction to the long side and has a circumferential length shorter than that of the long side, each central lateral groove connecting the long sides of the pair of central main grooves, each middle lateral groove connecting an outer zigzag corner of the central main groove with an inner zigzag corner of the shoulder main groove, wherein the outer zigzag corner protrudes on the side of the tread edge, and wherein the inner zigzag corner protrudes on the side of the tire equator, and the middle blocks being provided with an inclined slot on a location facing one of the central lateral grooves through the central main groove, wherein the inclined slot has a depth increasing gradually toward the central main groove.

In the heavy-duty tire according to the present invention, it is preferable that the inclined slot overlaps with an opening of the central lateral groove at the central main groove in a circumferential region of from 25% to 50% of a circumferential length of the central lateral groove.

In the heavy-duty tire according to the present invention, it is preferable that the inclined slot extends from the central main groove toward the shoulder main groove and terminates without reaching the shoulder main groove, and a length of the inclined slot from its opening facing the central main groove to its end is in a range of from 55% to 65% of a width of the central main groove.

In the heavy-duty tire according to the present invention, it is preferable that the inclined slot has a depth at a deepest portion in a range of from 50% to 100% of a depth of the central main groove.

In the heavy-duty tire according to the present invention, it is preferable that the middle blocks have an axial length in a range of from 95% to 105% of an axial length of the central blocks.

In the heavy-duty tire according to the present invention, it is preferable that a plurality of shoulder lateral grooves connecting the shoulder main groove with the tread edge are provided on each shoulder land portion to form a row of circumferentially arranged plurality of shoulder blocks each of which is defined by the shoulder main groove, the tread edge and a pair of shoulder lateral grooves.

In the heavy-duty tire according to the present invention, it is preferable that the shoulder blocks have an axial length in a range of from 95% to 105% of an axial length of the central blocks.

In the heavy-duty tire according to the present invention, it is preferable that the inclined slot comprises a slop inclined radially inwardly from a ground contact surface of the middle block, and an angle formed between the slop and the ground contact surface of the middle block is in a range of from 50 to 70 degrees.

In the heavy-duty tire according to the present invention, it is preferable that the long side is inclined at an angle of from 3 to 9 degrees with respect to the circumferential direction of the tire, the middle lateral grooves are inclined at an angle with respect to an axial direction of the tire, and the central lateral grooves are inclined in an opposite direction to the middle lateral grooves.

In the heavy-duty tire according to the present invention, it is preferable that the central main grooves comprises a first groove edge on the side of the tire equator and a second groove edge on the side of the tread edge, and the first groove edge comprises a first zigzag corner located nearest the tread edge, and the second groove edge comprises a second zigzag corner located nearest the tire equator, wherein the first zigzag corner is located on the side of the tire equator with respect to the second zigzag corner.

In the heavy-duty tire according to the present invention, it is preferable that a ratio of W11/TW of an axial distance W11 from the first zigzag corner to the second zigzag corner relative to a tread width TW is in a range of from 0.005 to 0.02.

In the heavy-duty tire according to the present invention, it is preferable that the shoulder main grooves comprise a third groove edge on the side of the tire equator and a fourth groove edge on the side of the tread edge, and the third groove edge comprises a third zigzag corner located nearest the tread edge, and the fourth groove edge comprises a fourth zigzag corner located nearest the tire equator, wherein the third zigzag corner is located on the side of the tire equator with respect to the fourth zigzag corner.

In the heavy-duty tire according to the present invention, it is preferable that a ratio of W21/TW of an axial distance W21 from the third zigzag corner to the fourth zigzag corner relative to a tread width TW is in a range of from 0.005 to 0.02.

In the heavy-duty tire according to the present invention, it is preferable that the central main grooves have an axial zigzag-amplitude W12 in a range of from 10% to 18% of an axial length WA of the central blocks.

In the heavy-duty tire according to the present invention, it is preferable that the tread portion has a land ratio in a range of not less than 65%.

In the heavy-duty tire according to the present invention, it is preferable that the tread portion has a land ratio in a range of not more than 75%.

In the heavy-duty tire according to the present invention, it is preferable that the inclined slot comprises a slope in a planar shape.

In the heavy-duty tire according to the present invention, it is preferable that a maximal depth D3 of the inclined slot is greater than an axial length W3 of the inclined slot.

In the heavy-duty tire according to the present invention, it is preferable that a circumferential length L4 of the inclined slot is greater than an axial length W3 of the inclined slot.

Advantageous Effects of Invention

The heavy-duty tire according to the present invention includes the middle lateral grooves each connecting the outer zigzag corner on the side of the tread edge of the central main groove with the inner zigzag corner on the side of the tire equator of the shoulder main groove. Such a middle lateral groove may offer an excellent drainage performance among the central main groove and the shoulder main groove and the middle lateral grooves.

Furthermore, the central lateral grooves connect the long sides of a pair of the central main grooves, and the middle blocks are provided with the inclined slot on the location facing one of the central lateral grooves through the central main grooves. Since the inclined slot has the depth increasing gradually toward the central main groove, drainage performance of the middle block improves by promoting the water flow from the middle block toward the central lateral grooves. Thus, it is possible to improve the drainage performance without increasing the groove volume, and therefore the wear resistance, uneven wear resistance and wet performance can be improved at a high level.

BRIEF DESCRIPTION OF DRAWINGS

FIG. 8 is a development view of the tread portion illustrating another embodiment of the heavy-duty tire according to the present invention.

FIG. 22 is a development view of the tread portion of Comparative Example 2.

DESCRIPTION OF EMBODIMENTS

Figure 1:
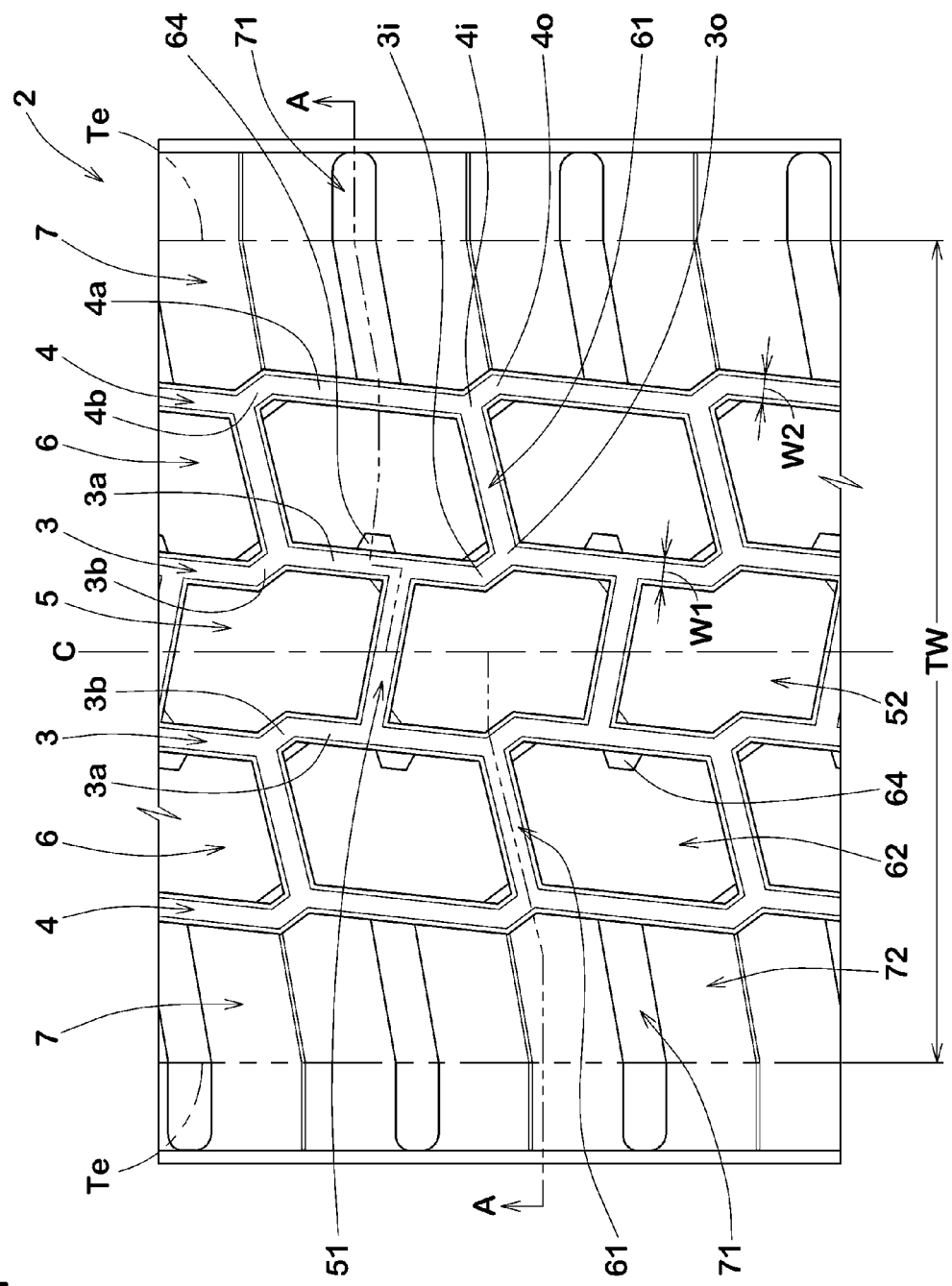
FIG. 1 is a development view of a tread portion illustrating an embodiment of a heavy-duty tire according to the present invention.
Figure 2A:
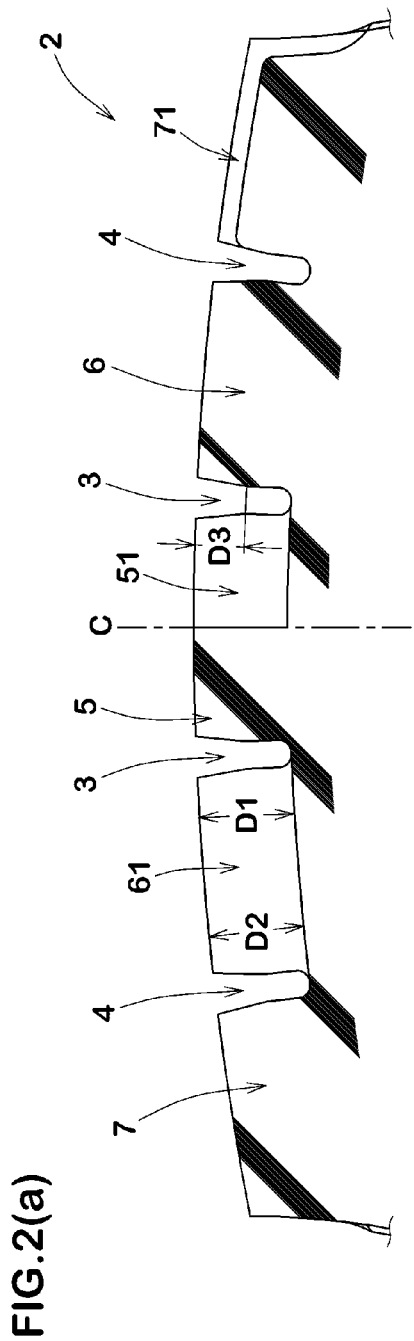
FIG. 2 is a cross-sectional view of the tread portion taken along lines A-A of FIG. 1.

An embodiment of the present invention will be explained below with reference to the accompanying drawings. FIG. 1 illustrates a development view of a tread portion 2 illustrating an embodiment of a heavy-duty tire (the whole not shown) according to the present invention. FIG. 2 illustrates a cross-sectional view of the tread portion 2 taken along lines A-A of FIG. 1. As illustrated in FIG. 1, the tread portion 2 is provided with a pair of circumferentially and continuously extending zigzag central main grooves 3 on both sides of the tire equator C and a pair of circumferentially and continuously extending zigzag shoulder main grooves 4 disposed axially outward of the central mail grooves 3.

The central main grooves 3 include a long side 3a inclined with respect to the circumferential direction of the tire and a short side 3b having a circumferential length shorter than that of the long side 3a, and which are arranged alternately in the circumferential direction of the tire. The short side 3b is inclined in an opposite direction to the long side 3a to form the zigzag central main grooves 3.

Similarly, the shoulder main grooves 4 include a long side 4a and a short side 4b having a circumferential length shorter than that of the long side 4a, and which are arranged alternately in the circumferential direction of the tire. The short side 4b is inclined in an opposite direction to the long side 4a to form the zigzag shoulder main grooves 4.

The central main grooves 3 include a plurality of inner zigzag corners 3i located nearest the tire equator C to protrude axially inwardly and a plurality of outer zigzag corners 3o located nearest the tread edge Te to protrude axially outwardly. Similarly, the shoulder main grooves 4 include a plurality of inner zigzag corners 4i located nearest the tire equator C to protrude axially inwardly and a plurality of outer zigzag corners 4o located nearest the tread edge Te to protrude axially outwardly.

Widths W1 of the central main grooves 3 and widths W2 of the shoulder main grooves 4 are set according to a tread width TW. As used herein, the tread width TW is an axial distance between the tread edges Te and Te.

As used herein, the tread edges Te refer to axially outermost edges of the ground contacting patch which occurs under a standard condition with a standard tire load when the camber angle of the tire is zero. Here, the standard condition is such that the tire 1 is mounted on a standard wheel rim (not illustrated) with a standard pressure and is loaded with no tire load. Various dimensions, positions and the like of the tire refer to those under the standard condition of the tire unless otherwise noted.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

Preferably, the widths W1 of the central main grooves 3 are in a range of from 1.5% to 5% of the tread width TW. When the widths W1 are less than 1.5% of the tread width TW, drainage performance of the tread portion 2 may deteriorate. When the widths W1 are more than 5% of the tread width TW, wear resistance and uneven wear resistance may deteriorate due to reduction of the rubber volume.

As illustrated in FIG. 2, the depths D1 of the central main grooves 3 are preferably in a range of from 10 to 20 mm. When the depths D1 are less than 10 mm, drainage performance of the tread portion 2 may deteriorate. When the depths D1 are more than 20 mm, wear resistance and uneven wear resistance may deteriorate due to reduction of rigidity of the tread portion 2.

Preferably, the widths W2 of the shoulder main grooves 4, for example, are in a range of from 1.5% to 5% of the tread width TW. Preferably, the depths D2 of the shoulder main grooves 4 are in a range of from 10 to 20 mm.

The tread portion 2 is separated into a plurality of land portions by the central main grooves 3 and the shoulder main grooves 4. That is, the tread portion 2 is separated into a central land portion 5 disposed between a pair of the central main grooves 3 and 3, a pair of middle land portions 6 each disposed between one of the central main grooves 3 and one of the shoulder main grooves 4, and a pair of shoulder land portions 7 each disposed axially outward of each shoulder main groove 4.

Figure 3:
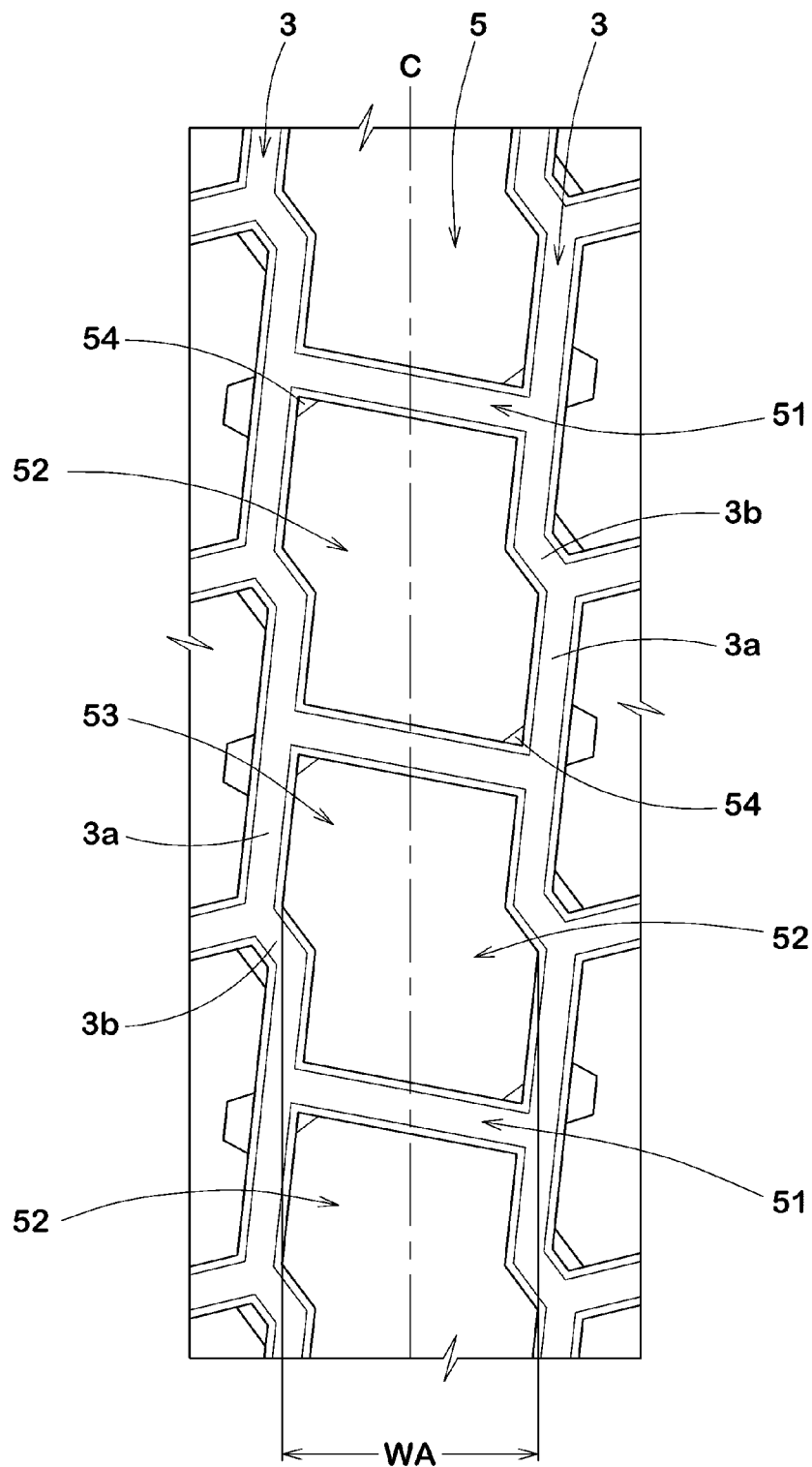
FIG. 3 is an enlarged development view of a crown land portion of FIG. 1.

FIG. 3 illustrates an enlarged development view of the central land portion 5 and a pair of the central main grooves 3 and 3. The central land portion 5 is provided with a plurality of central lateral grooves 51 connecting the central main grooves 3 and 3. Each of the central lateral grooves 51 connects the long sides 3a of a pair of the central main grooves 3. In the preferred embodiment, each end of the central lateral grooves 51, for example, is connected to a circumferential middle portion of the long side 3a. Such a central lateral groove 51 may improve wet performance of the heavy-duty tire by offering an excellent drainage performance between the central main grooves 3 and 3 as well as edge effect.

The central land portion 5 is separated into a plurality of central blocks 52 by the central lateral grooves 51. Thus, the central land portion 5 is formed as a row 53 of plurality of the central blocks 52 which are arranged apart from one another in the circumferential direction of the tire.

Chamfered portions 54 are provided on acute angle corners of the central blocks 52 where the central main groove 3 and the central lateral grooves 51 intersect. The acute angle corners of the central blocks 52 are positioned in a diagonal line of the central blocks 52. The chamfered portions 54 may promote the water flow between the central main groove 3 and the central lateral grooves 51. Furthermore, the chamfered portions 54 may relax the stress of the corners of the blocks to suppress damage such as chipping. Alternatively, a rounded corner portion may be provided on the corners instead of the chamfered portions 54.

Figure 4:
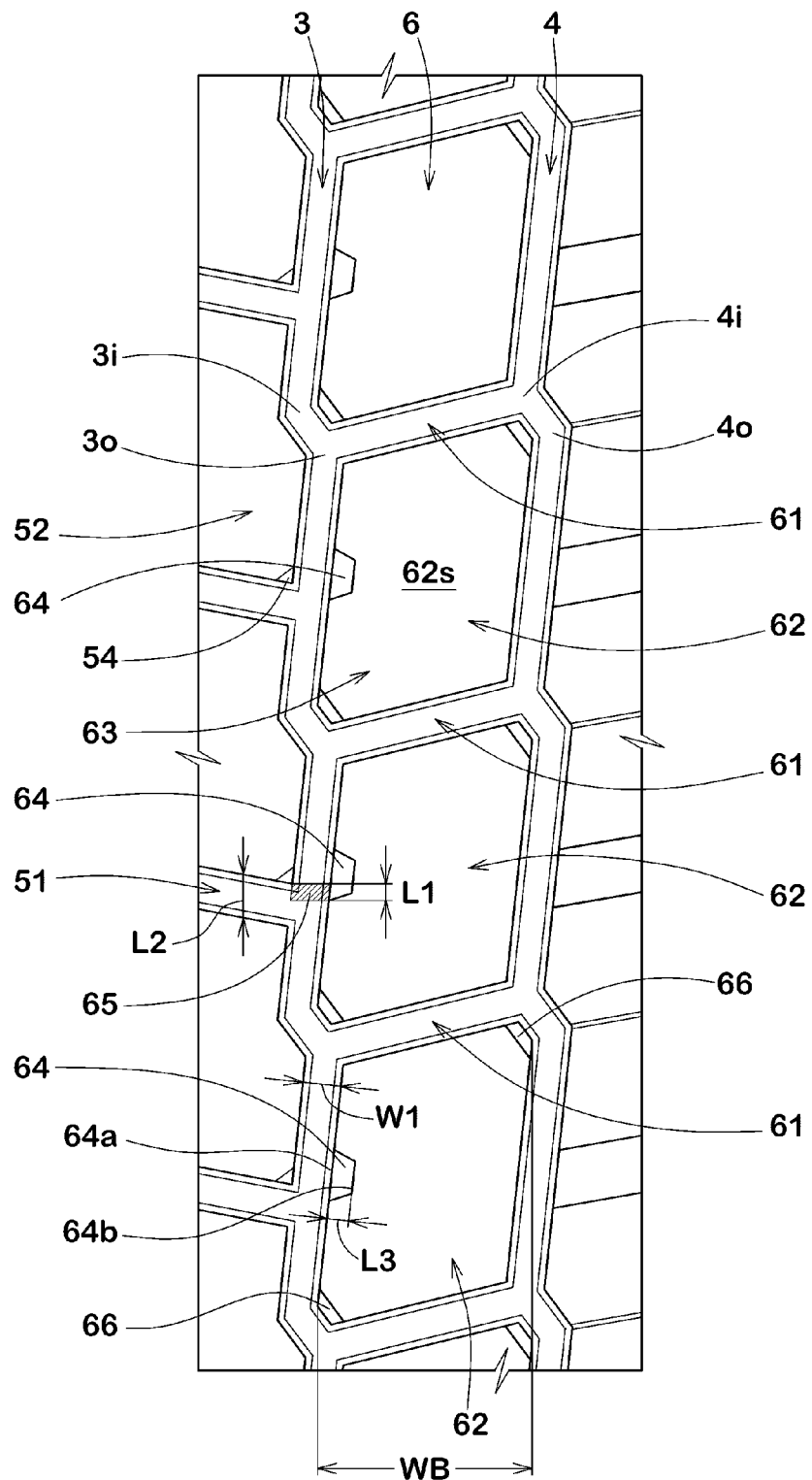
FIG. 4 is an enlarged development view of a middle land portion of FIG. 1.

FIG. 4 illustrates an enlarged view of the central main groove 3, the shoulder main groove 4 and the middle land portion 6. The middle land portion 6 is provided with a plurality of middle lateral grooves 61 each connecting between the central main groove 3 and the shoulder main groove 4. The middle lateral grooves 61 are inclined in an opposite direction to the central lateral grooves 51. Each of the middle lateral grooves 61 connects one of the outer zigzag corners 3o (an intersection between the long side 3a and the short side 3b) of the central main groove 3 with one of the inner zigzag corners 4i (an intersection between the long side 4a and the short side 4b) of the shoulder main groove 4. Such a middle lateral groove 61 may offer an excellent drainage performance as well as edge effect on a portion between the central main groove 3 and the shoulder main groove 4, thereby improving wet performance of the heavy-duty tire.

The middle land portion 6 is divided into a plurality of middle blocks 62 by the middle lateral grooves 61. Thus, the middle land portion 6 is formed as a row 63 of a plurality of middle blocks 62 arranged in the circumferential direction of the tire apart from one another.

Figure 5:
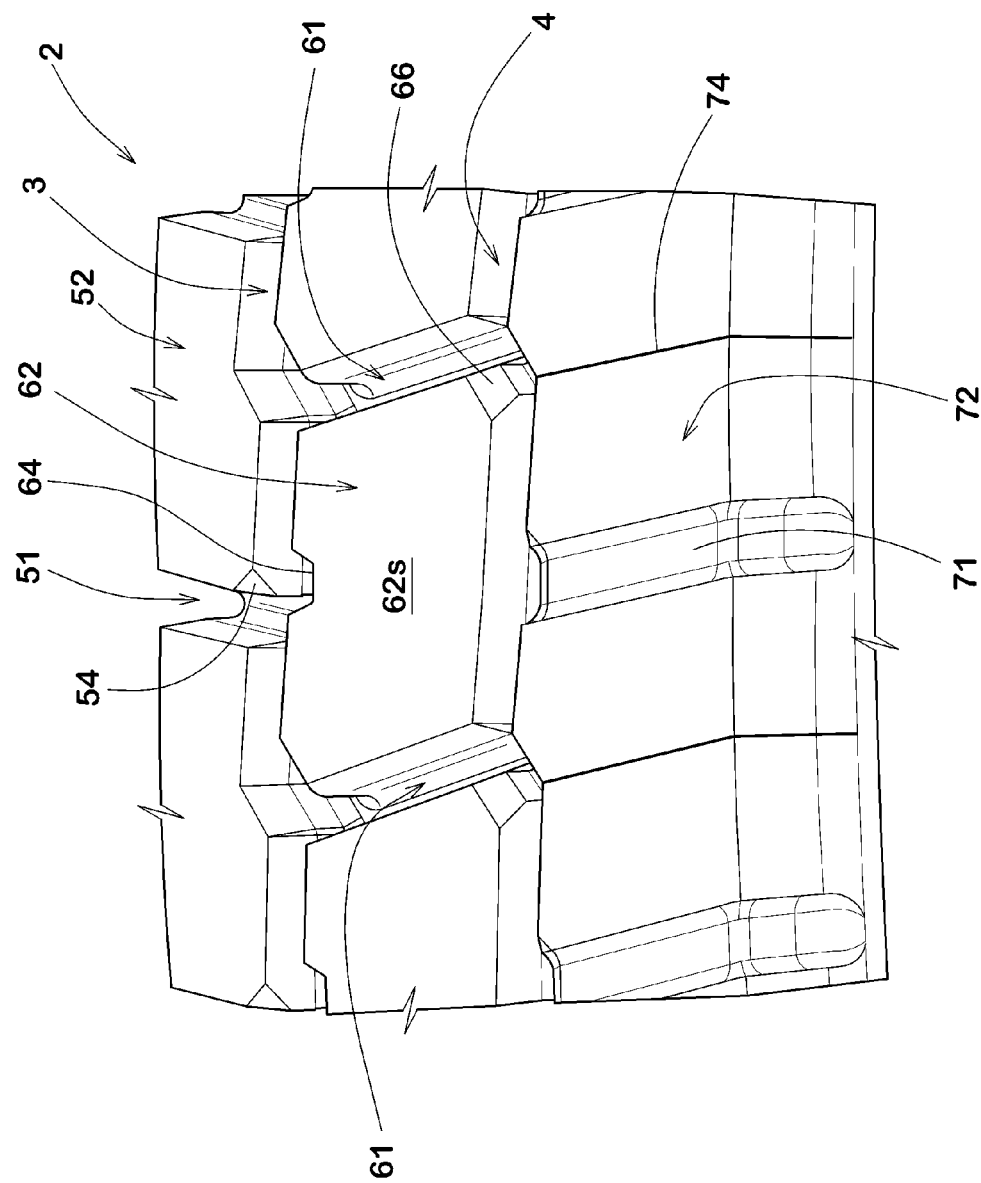
FIG. 5 is an enlarged perspective view of the tread portion of FIG. 1.
Figure 6:
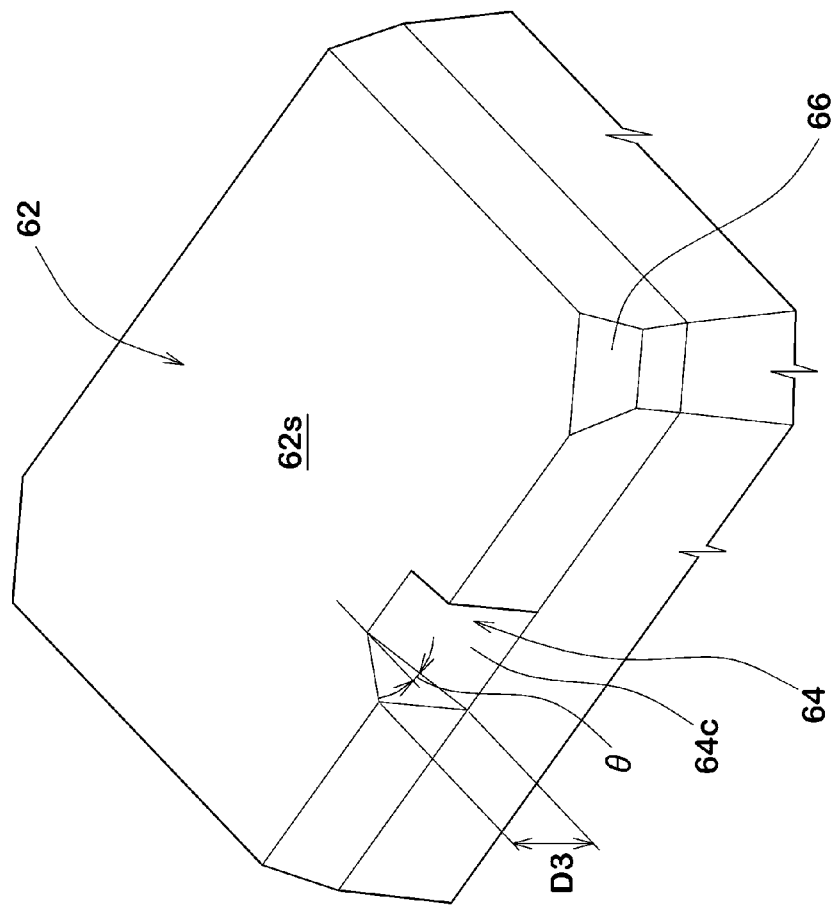
FIG. 6 is an enlarged perspective view of a middle block of FIG. 4.

FIG. 5 illustrates a partial enlarged view of the tread portion 2 viewed from one of the tread edges Te. FIG. 6 illustrates an enlarged view of the middle blocks 62 viewed from on the side of the tire equator C. As illustrated in FIGS. 4 to 6, each middle block 62 is provided with an inclined slot 64 on the side of the central main grooves 3, wherein the inclined slot 64 has a depth increasing gradually toward the central main groove 3.

The inclined slot 64 is provided on a location facing one of the central lateral grooves 51 through the central main groove 3. Here, the inclined slot 64 facing one of the central lateral grooves 51 should be understood to include an aspect where at least a part of the inclined slot 64 is provided within a projected region in which the central lateral groove 51 is projected in the axial direction of the tire. Such an inclined slot 64 may promote the water flow toward the central lateral groove 51 from the middle blocks 62 to improve drainage performance under the middle blocks 62.

In this embodiment, since the chamfered portions 54 are provided on the corners of the central blocks 52 which faces the inclined slot 64 through the central main groove 3, the water flow toward the central lateral groove 51 from the middle blocks 62 can further be promoted.

As illustrated in FIG. 4, a circumferential region 65 where the central lateral groove 51 and the inclined slot 64 face one another across the central main groove 3 is indicated by hatching. Preferably, the region 65 has a circumferential length L1 in a range of from 25% to 50% of a circumferential length L2 of the central lateral groove 51. That is, the inclined slot 64 and the central lateral groove 51 which faces the inclined slot 64 are overlapped one another in a circumferential region of from 25% to 50% of the circumferential length L2 of the central lateral groove 51.

When the length L1 is less than 25% of the length L2, the effect of promoting the flow of water toward the central lateral groove 51 from the middle blocks 62 by the inclined slot 64 may decrease. On the other hand, when the length L1 is more than 50% of the length L2, the flow of water toward the center lateral grooves 51 from one side of the middle blocks 62 with respect to the tire equator C tends to excessively be strong, and such a water flow may inhibit the flow of water toward the center lateral grooves 51 from the other side of the middle blocks 62. Accordingly, the drainage performance of the entire tread portion 2 may be lowered.

As illustrated in FIG. 4, each of the inclined slots 64 extends from the central main groove 3 toward the shoulder main groove 4, and terminates within each middle block 62 without reaching the shoulder main groove 4. A length of the inclined slot 64 from its opening 64a facing the central main groove 3 to its end 64b is in a range of from 55% to 65% of the width W1 of the central main groove 3.

When the length L3 is less than 55% of the width W1, due to insufficient capacity of the inclined slot 64, the effect of promoting the flow of water directed from the middle blocks 62 to the central lateral grooves 51 may decrease. On the other hand, when the length L3 is more than 65% of the width W1, due to insufficient rubber volume of the middle blocks 62, wear resistance may deteriorate. Furthermore, the rigidity of the middle blocks 62 may be lowered, and uneven wear resistance may be decreased.

Figure 2B:
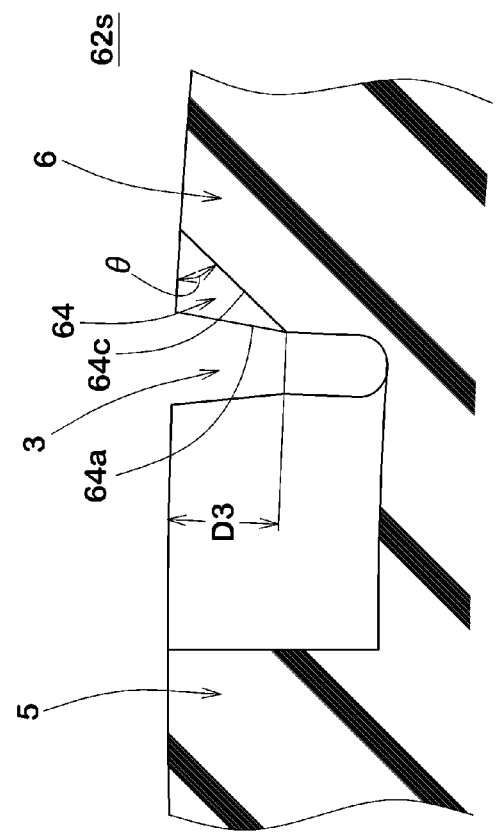

As illustrated in FIGS. 2B and 6, the depth D3 of the inclined slot 64 at the opening 64a, i.e., the depth of the deepest portion of the inclined slot 64, is preferably in a range of from 50% to 100% of the depth D1 of the central main groove 3.

When the depth D3 is less than 50% of the depth D1, the effect of promoting the water of flow toward the central lateral grooves 51 from the middle blocks 62 by the inclined slot 64 may decrease.

As illustrated in FIGS. 2B and 6, the inclined slot 64 includes a slope 64c on its bottom, and the slope 64c is inclined radially inwardly from the ground contact surface 62s of the middle block 62. Preferably, the angle θ formed between the ground contact surface 62s of the middle block 62 and the slope 64c is in a range of from 50 to 70 degrees, for example.

When the angle θ is less than 50 degrees, due to insufficient volume of the inclined slot 64, the effect of promoting the flow of water going toward the central lateral grooves 51 from the middle block 62 may decrease. On the other hand, when the angle θ is more than 70 degrees, due to insufficient rubber volume of the middle blocks 62, wear resistance may deteriorate. Furthermore, the rigidity of the middle blocks 62 may be lowered, and uneven wear resistance may also be decreased.

As illustrated in FIG. 1, in this embodiment, the inclined slots 64 and 64 provided on both sides of each central lateral groove 51 are located in different positions from each other with respect to the circumferential direction of the tire. Such inclined slots 64 effectively suppress uneven wear of the middle blocks 62.

As illustrated in FIGS. 4 to 6, chamfered portions 66 are provided on acute angle corners of the middle blocks 62 where the central main groove 3 or the shoulder main groove 4 intersects the middle lateral grooves 61. The acute angle corners of the middle blocks 62 are positioned in a diagonal line of the middle blocks 62. The chamfered portions 66 may promote the flow of water between the central main groove 3 and the middle lateral grooves 61 as well as the flow of water between the shoulder main groove 4 and the middle lateral grooves 61. Furthermore, the chamfered portions 66 may relax the stress of the corners of the blocks to suppress damage such as chipping. Alternatively, a rounded corner portion may be provided on the corners instead of the chamfered portions 66.

Figure 7:
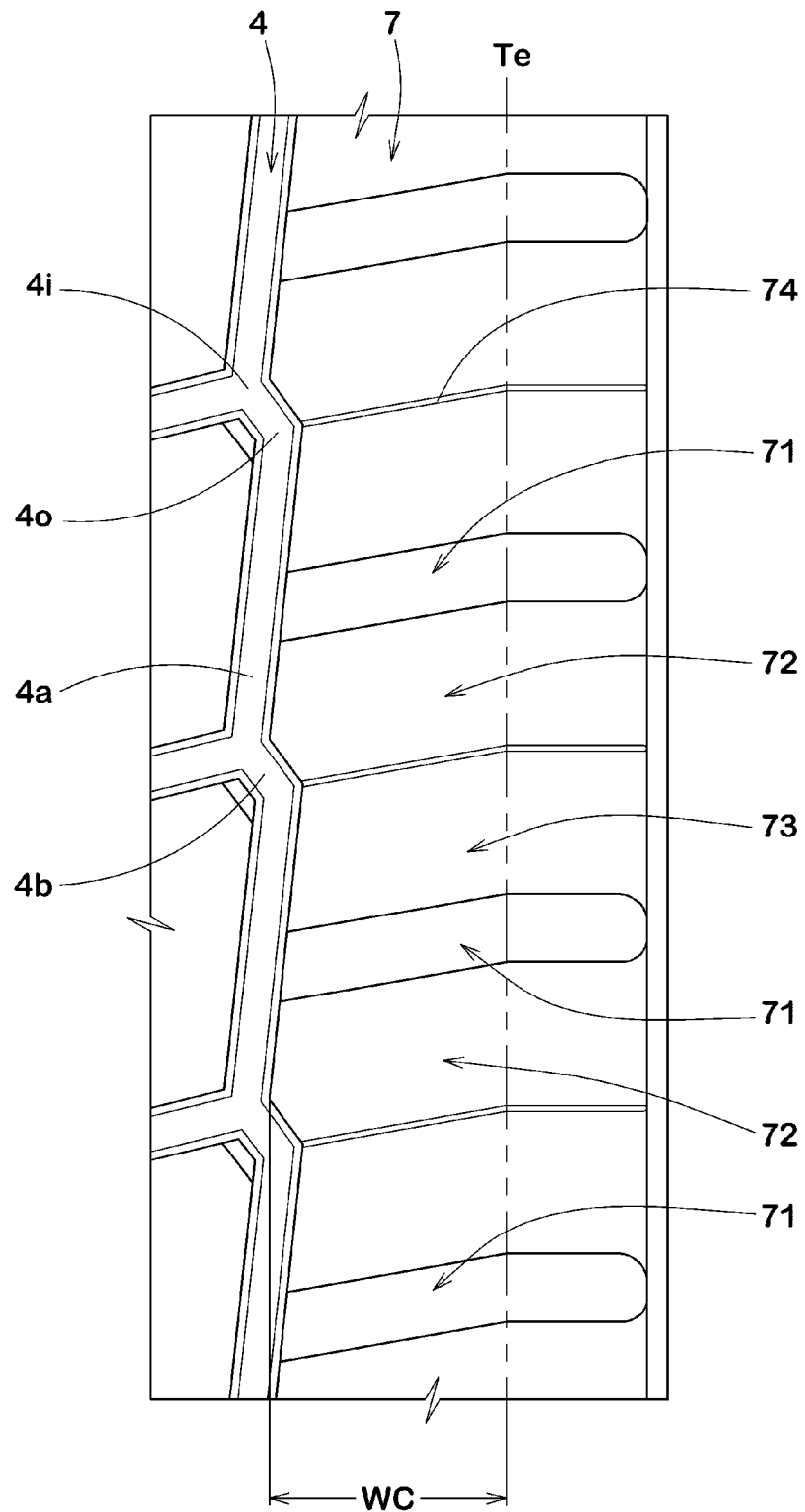
FIG. 7 is an enlarged perspective view of a shoulder land portion of FIG. 1.

FIG. 7 illustrates an enlarged view of the shoulder main groove 4 and the shoulder land portion 7. The shoulder land portion 7 is provided with a plurality of shoulder lateral grooves 71 each communicating the shoulder main groove 4 with the tread edge Te. The shoulder lateral grooves 71 communicate between the long sides 4a of the shoulder main groove 4 and the tread edge Te. The shoulder land portion 7 is divided into a plurality of shoulder blocks 72 by a plurality of the shoulder lateral grooves 71. Thus, the shoulder land portion 7 is formed as a row 73 of a plurality of the shoulder blocks 72 arranged in the circumferential direction of the tire apart from one another.

The shoulder land portion 7 is provided with a plurality of shoulder lateral sipes 74 that extend from the shoulder main groove 4 to the tread edge Te. As used herein, a "sipe" means a cut having a width of equal to or less than 1.0 mm, and which is distinguishing from a groove for drainage. The shoulder lateral sipes 74 connect the outer zigzag corners 4o of the shoulder main groove 4 with the tread edge Te. Due to edge effect of the shoulder lateral sipes 74, wet performance of the heavy-duty tire can be improved.

As illustrated in FIG. 3, the central blocks 52 have an axial maximal width WA in a range of from 0.15 to 0.25 times of the tread width TW (shown in FIG. 1, and the same hereinafter). The central blocks 52 may offer an excellent wear resistance while maintaining wet performance.

As illustrated in FIGS. 3 and 4, the middle blocks 62 have an axial length WB in a range of from 95% to 105% of the axial length WA of the central blocks 52, for example.

When the length WB is less than 95% of the above mentioned length WA, there is a possibility that uneven wear occurs on the middle blocks 62 due to insufficient rubber volume of the middle blocks 62. On the other hand, when the length WB is more than 105% of the length WA, there is a possibility that uneven wear occurs on the central blocks 52 due to insufficient rubber volume of the central blocks 52.

Similarly, as illustrated in FIGS. 3 and 7, an axial length WC of the shoulder blocks 72, for example, is in a range of from 95% to 105% of the axial length WA of the central blocks 52.

When the length WC is less than 95% of the length WA, there is a possibility that uneven wear occurs on the shoulder blocks 72 due to insufficient rubber volume of the shoulder blocks 72. On the other hand, when the length WC is more than 105% of the length WA, there is a possibility that uneven wear occurs on the central blocks 52 due to insufficient rubber volume of the central blocks 52.

Preferably, the land ratio of the tread portion 2 having the above-mentioned pattern is in a range of from 65% to 75%, for example.

When the land ratio of the tread portion 2 is less than 65%, there is a possibility that the wear resistance and the uneven wear resistance is deteriorated due to insufficient rubber volume of the tread portion 2 and reduction of rigidity of the tread portion 2. Furthermore, chipping may be occurred on the central blocks 52, the middle blocks 62 and the shoulder blocks 72 due to rigidity reduction of the tread portion 2. On the other hand, when the land ratio of the tread portion 2 is more than 75%, drainage performance may be deteriorated due to reduction of groove volume of the tread portion 2.

As described above, in the heavy-duty tire according to the present embodiment, since the middle lateral grooves 61 connect the outer zigzag corners 30 of the central main groove 3 to the inner zigzag corners 4i of the shoulder main groove 4, drainage performance of a portion among the central main groove 3, the shoulder main groove 4 and the middle lateral grooves 61 can be improved.

Furthermore, the central lateral grooves 51 connect between the long sides 3a and 3a of the central main grooves 3, and the middle blocks 62 are provided with inclined slots 64 on a location facing one of the central lateral grooves 51 through the central main groove 3. Since the inclined slot 64 has a depth gradually increasing toward the central main groove 3, the water flow directed toward the central lateral groove 51 from the middle blocks 62 can be promoted, thereby improving drainage performance around the middle blocks 62. Thus, drainage performance can be improved without increasing groove volume of the tread portion 2. Consequently, wear resistance, uneven wear resistance and wet performance of the heavy-duty tire can be improved in high level.

Figure 9A:
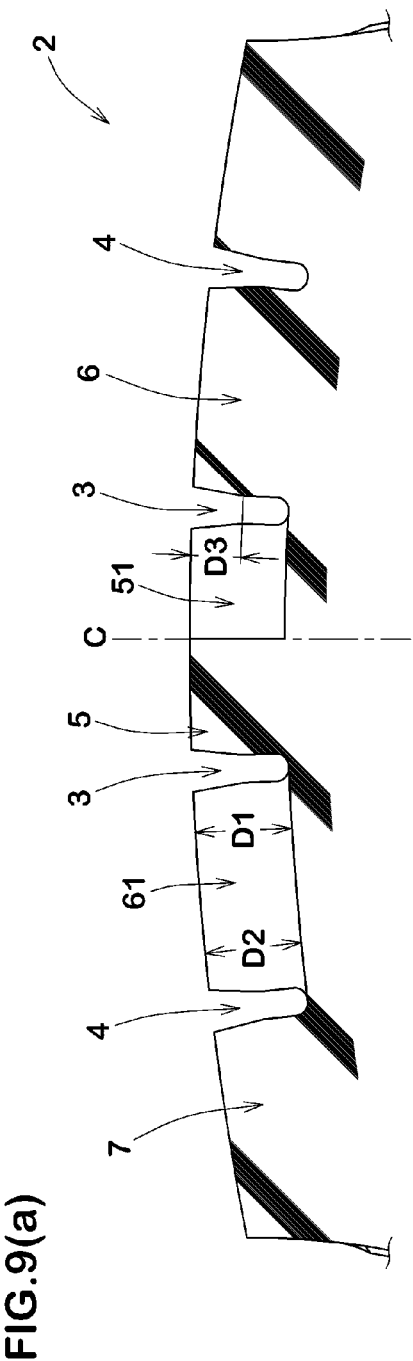
FIG. 9 is a cross-sectional view of the tread portion taken along lines A-A of FIG. 8.
Figure 9B:
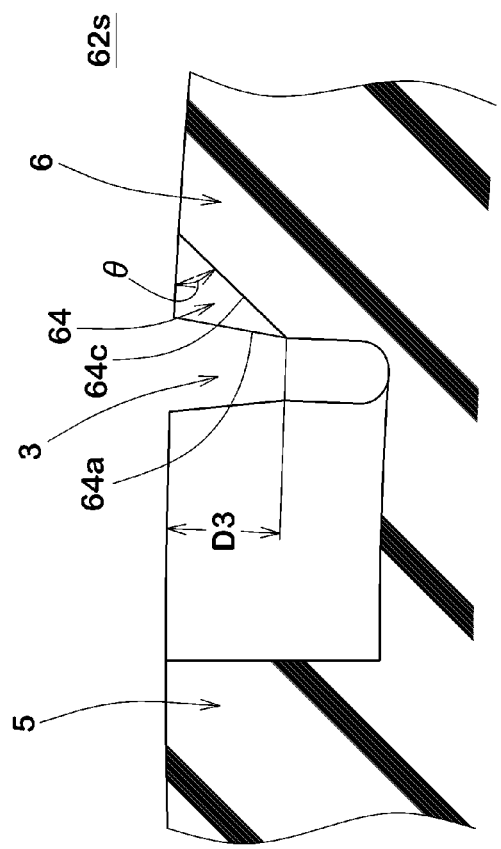

FIG. 8 illustrates a developed view of the tread portion in accordance with another embodiment of the heavy-duty tire. FIG. 9 illustrates a cross-sectional view of the tread portion 2 taken along lines A-A of FIG. 8. In the heavy-duty tire according to the present embodiment, note that portions which are not described in the following can be embodied as the configuration of the heavy duty tire as illustrated in FIGS. 1 to 7 discussed above.

In FIG. 8, angles $\alpha 1$ of long sides 3a of the central main grooves 3 are preferably in a range of not less than 3 degrees, more preferably in a range of not less than 5 degrees, but preferably in a range of not more than 9 degrees, more preferably in a range of not more than 7 degrees, relative to the circumferential direction of the tire. When the angles $\alpha 1$ are less than 3 degrees, it may be difficult to obtain sufficient traction on wet condition due to insufficient axial edge components. On the other hand, when the angles $\alpha 1$ are more than 9 degrees, it may be difficult to offer sufficient wet performance due to reduction of the drainage performance of the central main grooves 3 caused by a large zigzag-amplitude of the central main groove 3.

As with the central main grooves 3, angles $\alpha 2$ of the long sides 4a of the shoulder main grooves 4 are preferably in a range of from not less than 3 degrees, more preferably not less than 5 degrees, but preferably in a range of not more than 9 degrees, more preferably not more than 7 degrees, relative to the circumferential direction of the tire. The heavy-duty tire in accordance with the present embodiment exhibits an excellent wet performance since the angles $\alpha 1$ of the long sides 3a of the central main grooves 3 and the angles $\alpha 2$ of the long sides 4a of the shoulder main grooves 4 are set in a suitable range.

Figure 10:
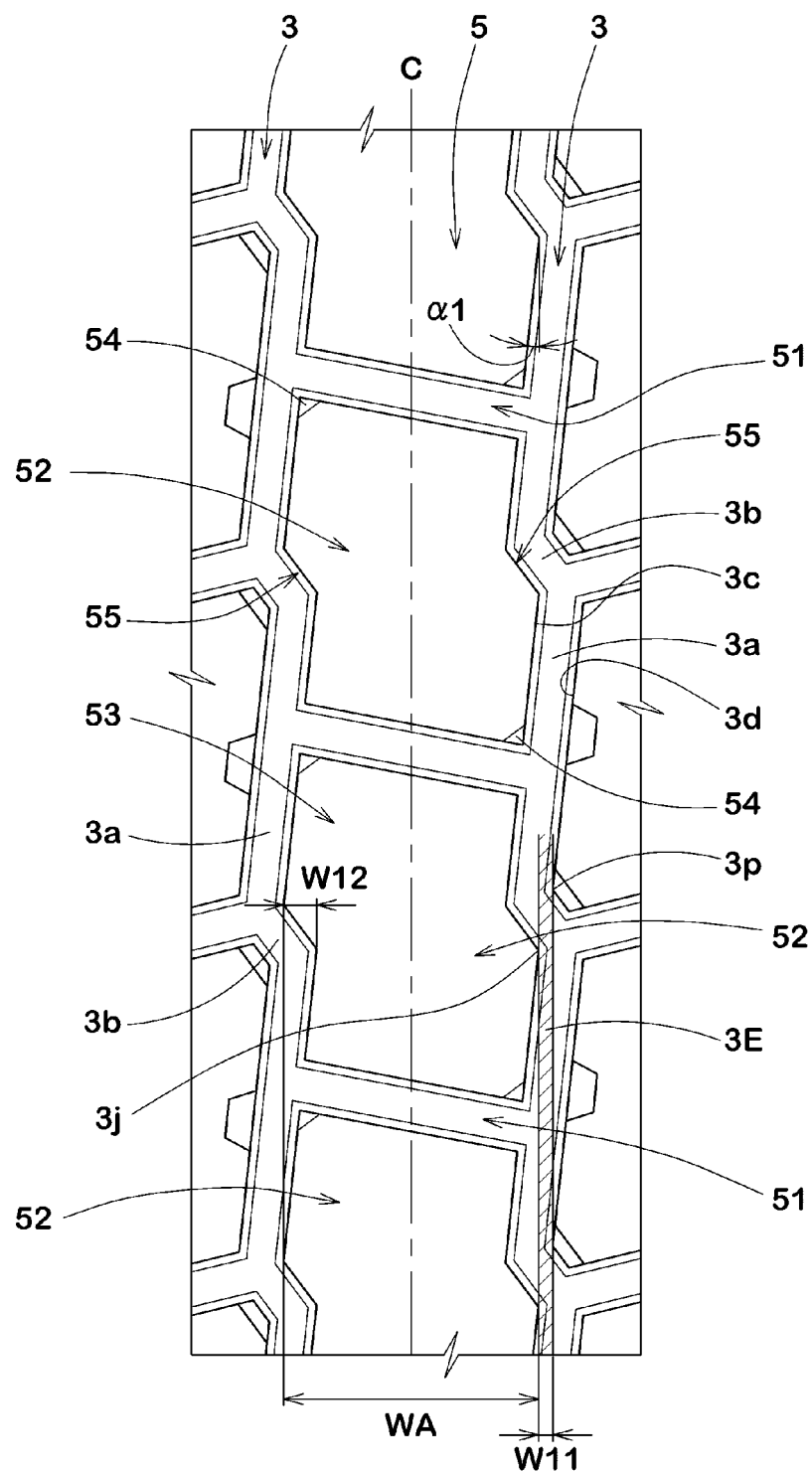
FIG. 10 is an enlarged development view of the crown land portion of FIG. 8.

FIG. 10 illustrates a central region of the tread portion 2 including a pair of the central main grooves 3 and 3. Each central main groove 3 includes a first groove edge 3c on the side of the tire equator C and a second groove edge 3d on the side of the tread edge Te. The first groove edge 3c includes a plurality of first zigzag corners 3j located nearest the tread edge Te. The second groove edge 3d includes a plurality of second zigzag corners 3p located nearest the tire equator C.

Each first zigzag corner 3j is located on the side of the tire equator C with respect to each second zigzag corner 3p. That is, as illustrated by hatching in FIG. 10, the central main groove 3 includes a straight grooved region 3E that straightly extends along the circumferential direction of the tire between the first zigzag corners 3j and the second zigzag corners 3p. In this embodiment, since the central main groove 3 includes the straight grooved region 3E, drainage performance of the central main groove 3 may be improved, thereby improving wet performance of the heavy-duty tire.

The width of the straight grooved region 3E corresponds to an axial distance W11 measured from one of the first zigzag corners 3j to one of the second zigzag corners 3p. A ratio W11/TW of the distance W11 to the tread width TW, for example, is preferably in a range of not less than 0.005, more preferably not less than 0.01, and preferably not more than 0.02, more preferably not more than 0.015.

When the ratio W11/TW is less than 0.005, it may be difficult to improve drainage performance of the central main groove 3 sufficiently due to lack of the width of the straight grooved region 3E. On the other hand, when the ratio W11/TW is more than 0.02, the wear resistance and uneven wear resistance may be deteriorated due to lack of rubber volume of the central region of the tread portion 2.

Figure 11:
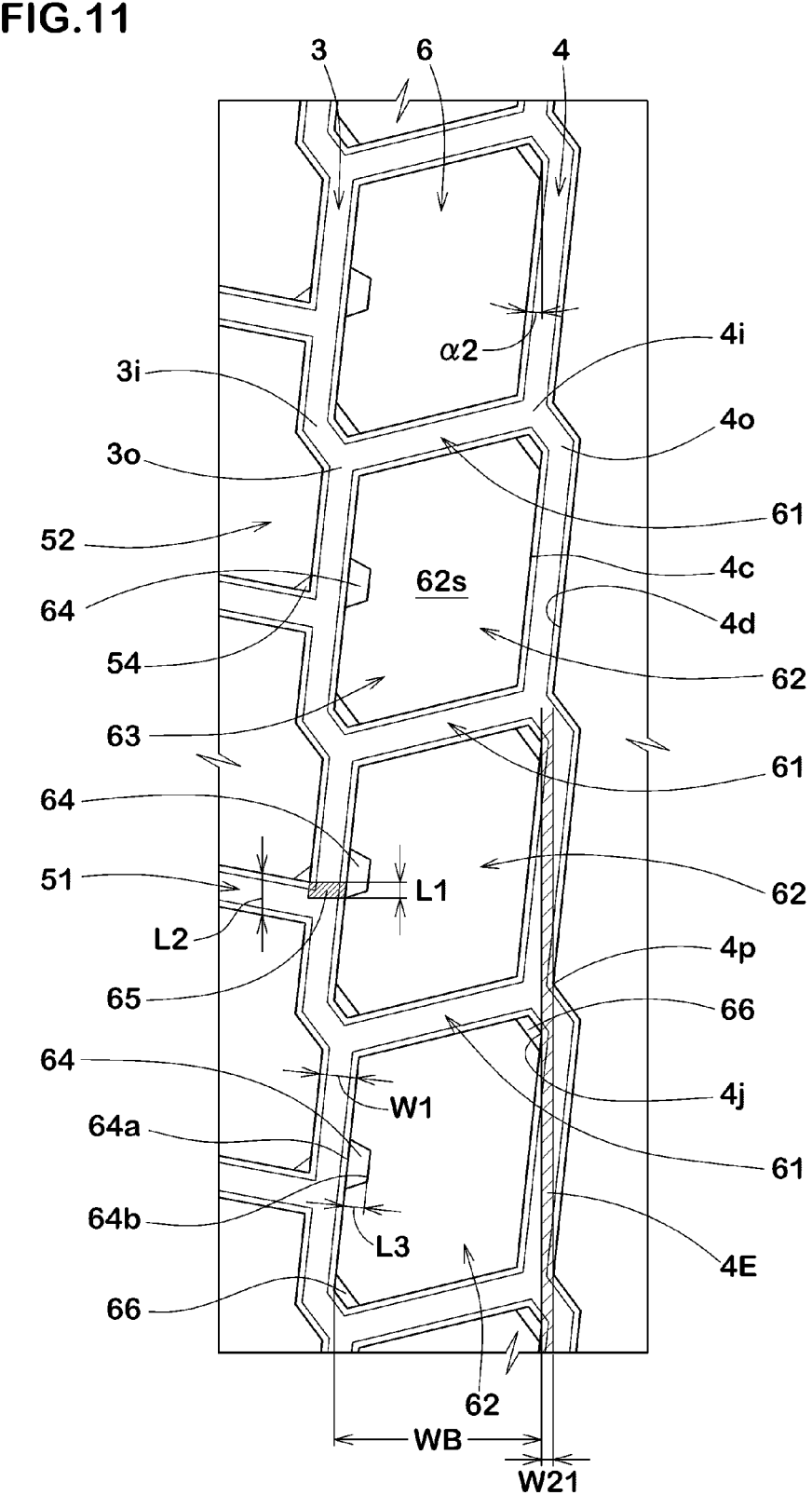
FIG. 11 is an enlarged development view of the middle land portion of FIG. 8.

FIG. 11 illustrates a middle region of the tread portion 2 which includes one of the central main grooves 3 and one of the shoulder main grooves 4. The shoulder main groove 4 includes a third groove edge 4c on the side of the tire equator C and a fourth groove edge 4d on the side of the tread edge Te. The third groove edge 4c includes a plurality of third zigzag corners 4j located nearest the tread edge Te. The fourth groove edge 4d includes a plurality of fourth zigzag corners 4p located nearest the tire equator C.

Each third zigzag corner 4j is located on the side of the tire equator C with respect to each fourth zigzag corner 4p. That is, as illustrated by hatching in FIG. 11, the shoulder main groove 4 includes a straight grooved region 4E that straightly extends along the circumferential direction of the tire between the third zigzag corners 4j and the fourth zigzag corners 4p. In this embodiment, since the shoulder main groove 4 includes the straight grooved region 4E, drainage performance of the shoulder main groove 4 may be improved, thereby improving wet performance of the heavy-duty tire.

The width of the straight grooved region 4E corresponds to an axial distance W21 measured from one of the third zigzag corners 4*j* to one of the fourth zigzag corners 4*p*. A ratio W21/TW of the distance W21 to the tread width TW, for example, is preferably in a range of not less than 0.005, more preferably not less than 0.01, and preferably not more than 0.02, more preferably not more than 0.015.

When the ratio W21/TW is less than 0.005, it may be difficult to improve drainage performance of the shoulder main groove 4 sufficiently due to lack of the width of the straight grooved region 4E. On the other hand, when the ratio W21/TW is more than 0.02, the wear resistance and uneven wear resistance may be deteriorated due to lack of rubber volume of the central region of the tread portion 2.

As illustrated in FIG. 10, each of the central blocks 52 is formed into an octagonal shape having a pair of stepped portions 55 by the zigzag central main grooves 3. Preferably, the central main grooves have an axial zigzag-amplitude W12 in a range of not less than 10% of a maximal axial length WA of the central blocks 52, more preferably not less than 13%, but preferably not more than 18%, more preferably not more than 16%.

When the zigzag-amplitude W12 is less than 10% of the maximal axial length WA, it may be difficult to obtain sufficient traction on wet road due to lack of an axial edge component. On the other hand, the zigzag-amplitude W12 is more than 18% of the maximal axial length WA, it may be difficult to obtain sufficient wet performance due to lack of drainage performance of the central main grooves 3.

Figure 12:
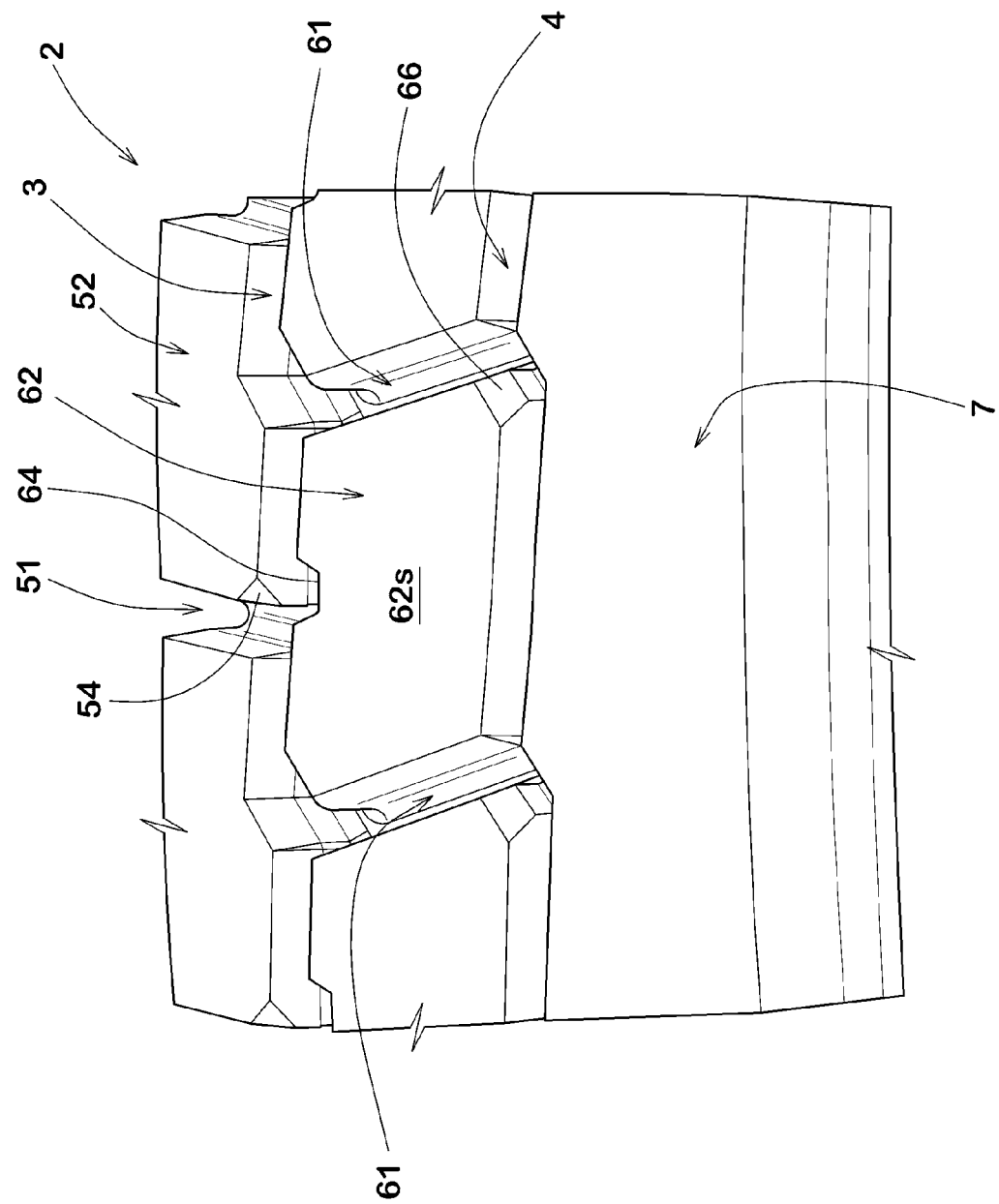
FIG. 12 is a partial enlarged perspective view of the tread portion of FIG. 8.
Figure 13:
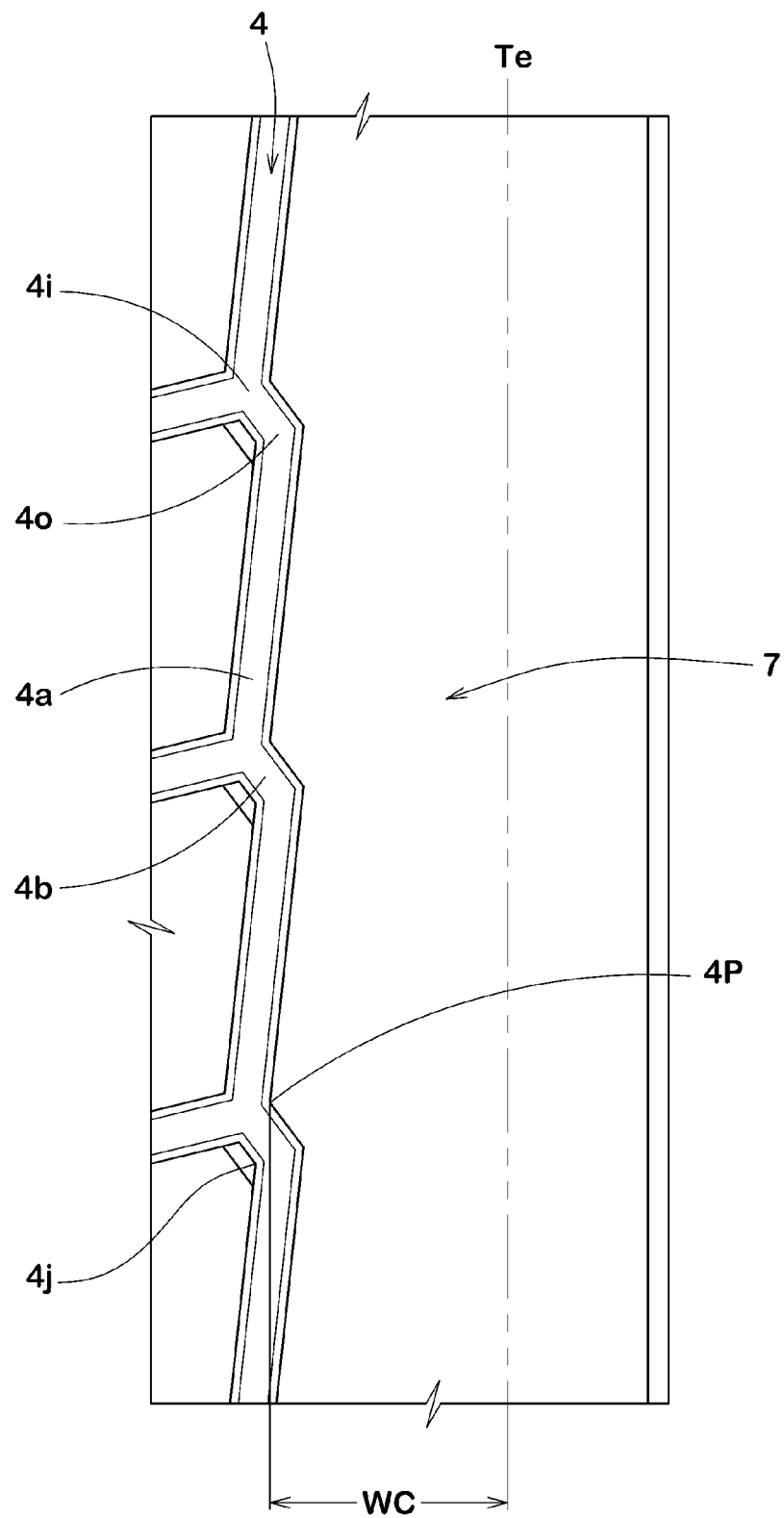
FIG. 13 is an enlarged development view of the shoulder land portion of FIG. 8.

FIG. 12 illustrates a partial enlarged view of the tread portion 2 viewed from the tread edge Te. FIG. 13 illustrates an enlarged view of the shoulder main groove 4 and the shoulder land portion 7. In this embodiment, the shoulder land portion 7 is formed continuously in the circumferential direction of the tire. Since the shoulder land portion 7 has a high rigidity, uneven wear such as shoulder wear may be suppressed. Furthermore, since the shoulder land portion 7 may ensure sufficient rubber volume around the tread edge Te, wear resistance and uneven wear resistance may be improved.

As illustrated in FIGS. 10 and 13, the axial maximal length WC of the shoulder land portion 7, for example, is in a range of not less than 95%, more preferably not less than 98%, but preferably not more than 105%, more preferably not more than 102% of the axial maximal length WA of the central blocks 52.

When the maximal length WC is less than 95% of the length WA, uneven wear may be occurred on the shoulder land portion 7 due to lack of rubber volume of the shoulder land portion 7. On the other hand, when the maximal length WC is more than 105% of the length WA, uneven wear may be occurred on the central block 52 due to lack of rubber volume of the central blocks 52.

In this embodiment, since the shoulder land portion 7 is continuous in the circumferential direction of the tire, sufficient land ratio of the tread portion 2 can be ensured, and wear resistance and uneven wear resistance can be improved. Preferably, the land ratio of the tread portion 2 is set in a range of not less than 70%.

When the land ratio of the tread portion 2 is less than 70%, wear resistance and uneven wear resistance may be deteriorated due to rigidity reduction of the tread portion 2 caused by reduction of rubber volume of the tread portion 2. Furthermore, chipping may be occurred on the central blocks 52 and the middle blocks 62 due to rigidity reduction of the tread portion 2.

Figure 14:
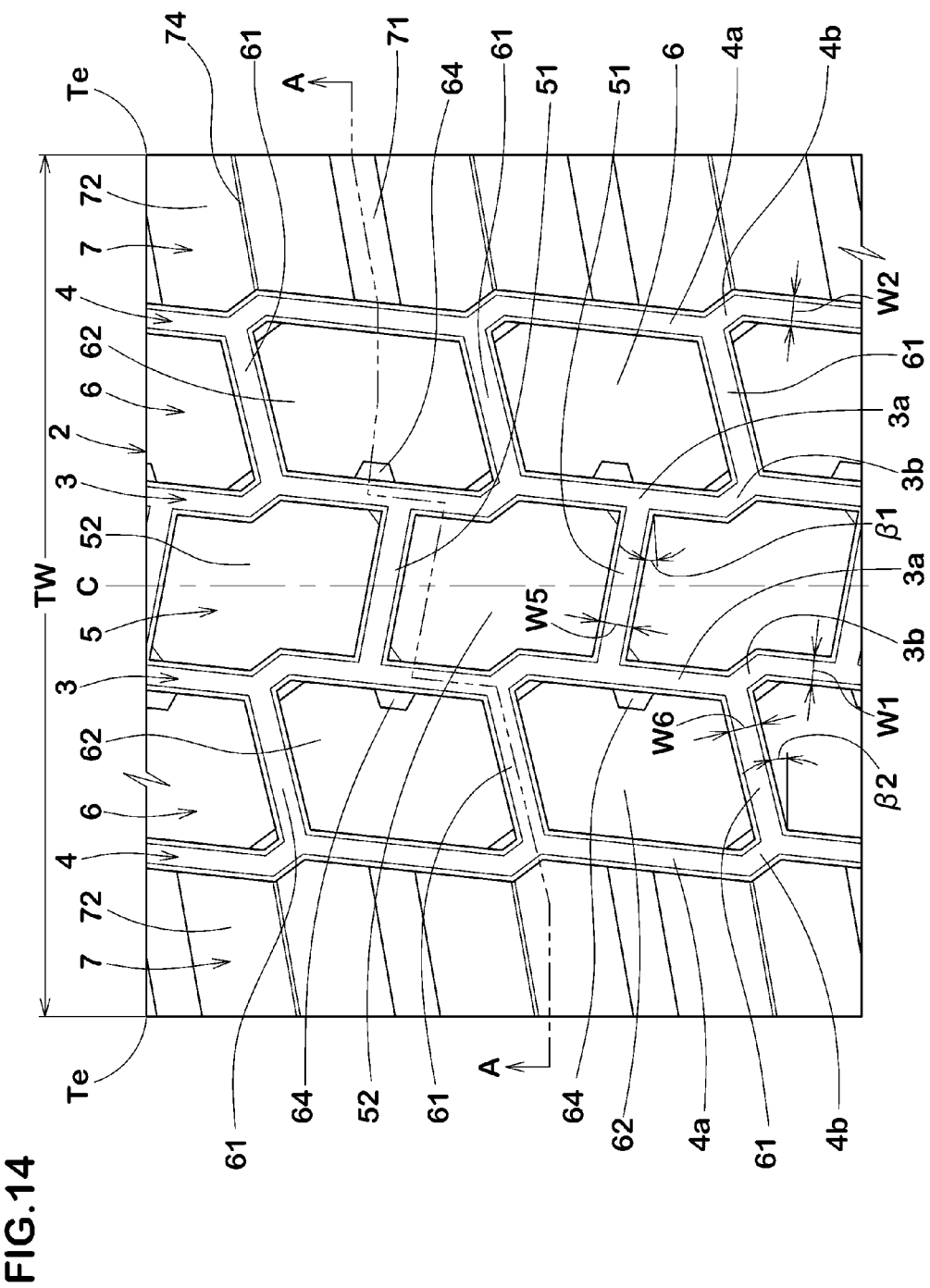
FIG. 14 is a development view of the tread portion of the pneumatic tire of the present embodiment.
Figure 15:
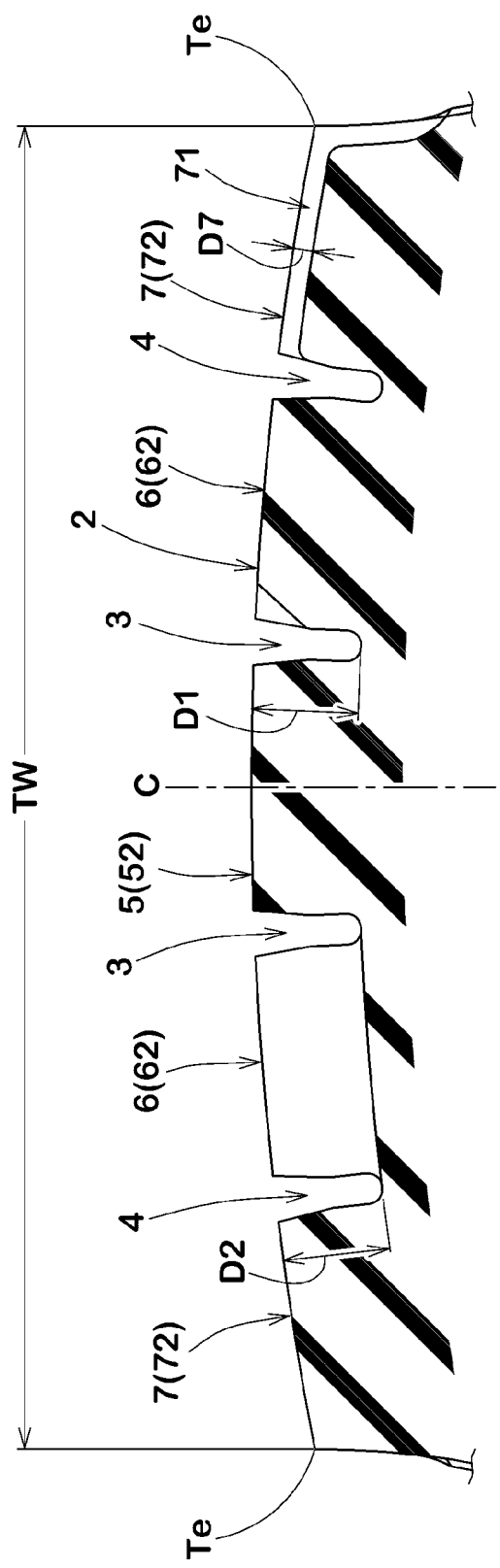
FIG. 15 is a cross-sectional view taken along a line A-A of FIG. 14.

FIG. 14 illustrates a development view of the tread portion of the heavy-duty tire in accordance with another embodiment of the present embodiment. FIG. 15 illustrates a cross-sectional view of the tread portion 2 taken along a line A-A of FIG. 14. In the heavy-duty tire according to the present embodiment, note that portions which are not described in the following can be embodied as the configuration of the heavy duty tire as illustrated in FIGS. 1 to 13 discussed above.

In this embodiment, the central lateral grooves 51 are connected approximately vertical to the long sides 3*a*. The central lateral grooves 51 are inclined at an angle β1 of from 5 to 15 degrees relative to the axial direction of the tire.

The widths W5 of the central lateral grooves 51, for example, are in a range of from 5.0 to 10.0 mm. Such a central lateral groove 51 may improve wet performance while ensuring wear resistance.

The angles β2 of the respective middle lateral grooves 61, for example, are in a range of from 5 to 15 degrees relative to the axial direction of the tire. The widths W6 of the middle lateral grooves 61, for example, are in a range of from 5.0 to 10.0 mm.

Figure 16:
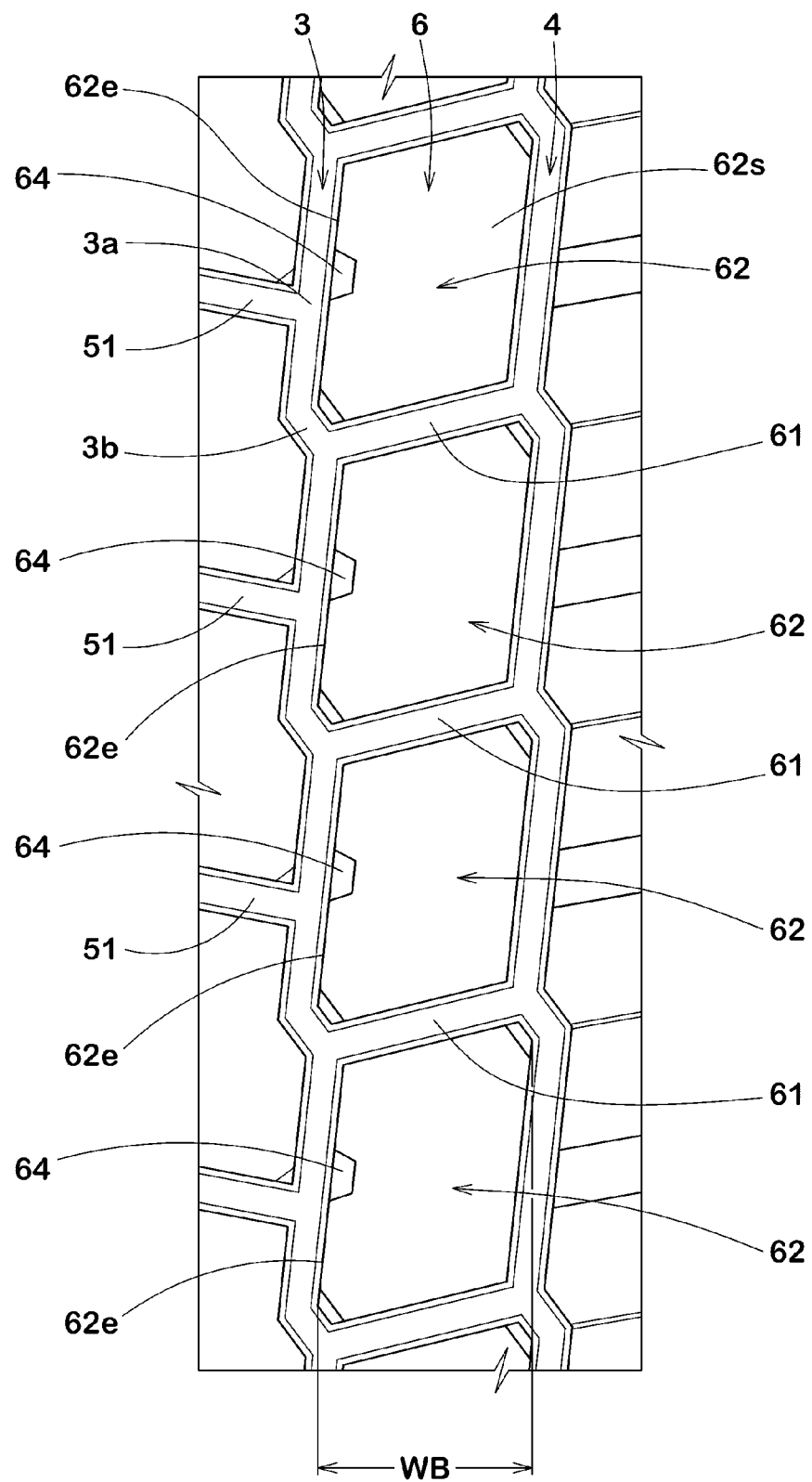
FIG. 16 is an enlarged view of the middle land portion of FIG. 14.
Figure 17:
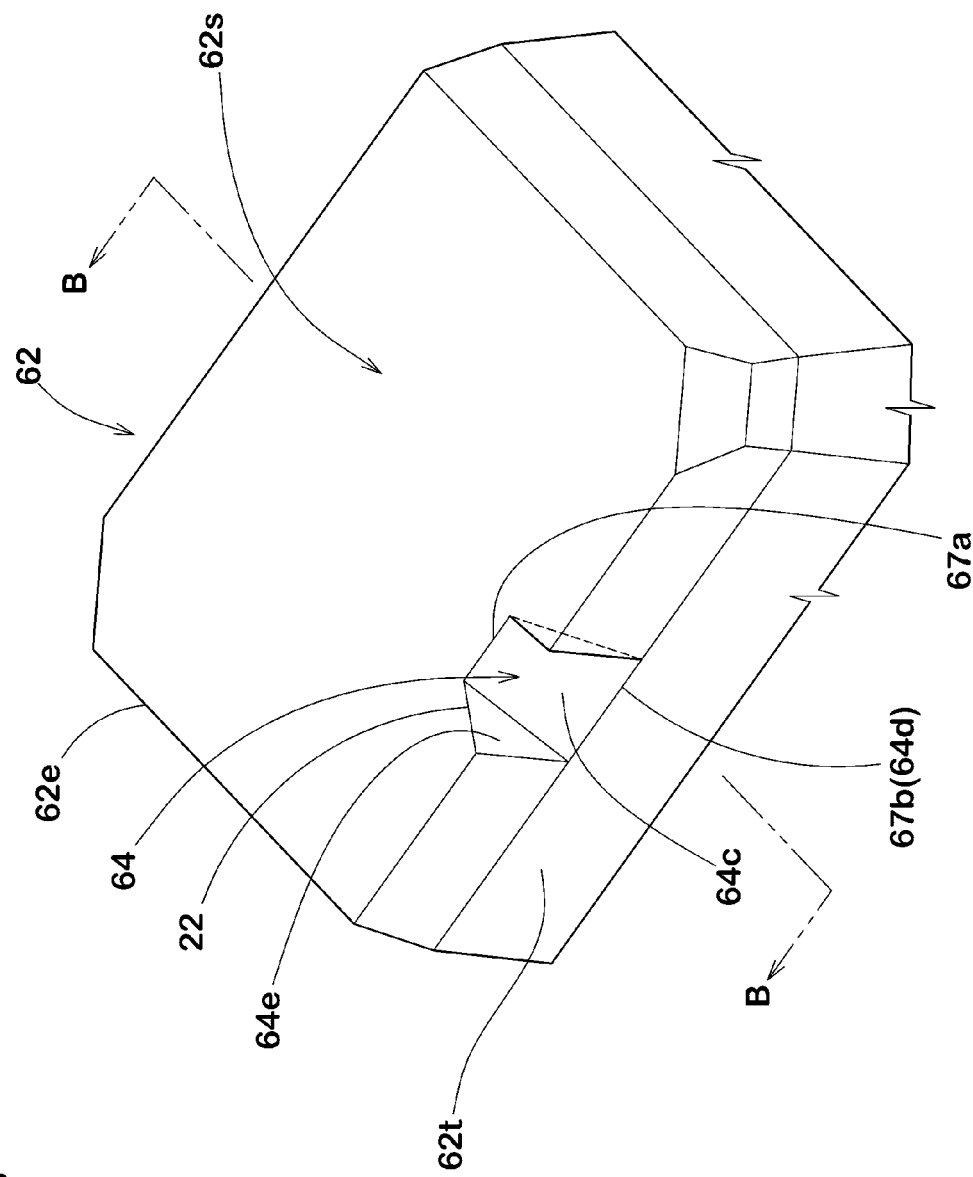
FIG. 17 is an enlarged perspective view of the middle block of FIG. 16.

FIG. 16 illustrates an enlarged view of the middle land portion 6. FIG. 17 illustrates an enlarged perspective view of a middle block 62. Each of the middle blocks 62 includes a ground contact surface 62*s* in substantially parallelogram shape. Each of the middle blocks 62 is provided with the inclined slot 64 where the edge 62*e* is recessed.

The slope 64*c*, for example, has an approximately trapezoidal shape in which a first edge 67*a* on the ground contact surface 62*s* of the middle blocks 62 is parallel to a second edge 67*b* on the sidewall 62*t* of the middle blocks 62.

Such a middle block 62 with the inclined slot 64 may exhibit high rigidity as compared with a block with a narrow groove which perfectly traverses the block. Thus, wear resistance of the block can be improved. In addition, since the inclined slot 64 includes the slope 64*c*, rigidity of the middle blocks 62 around the inclined slot 64 may be changed gradually from a middle side of the block toward the central main groove. Accordingly, the middle blocks 62 may offer an excellent uneven wear resistance as compared with a block provided with the narrow groove or lug groove.

Furthermore, each inclined slot 64 may guide water from between the ground contact surface 62*s* of the middle blocks 62 and the ground smoothly to the central main groove 3 when traveling on wet road. Since each inclined slot 64 faces each central lateral groove 51 one another, the water guided by the inclined slot 64 into the central main groove 3 is drained effectively outside the tire in conjunction with water in the central lateral groove 51. Accordingly, the pneumatic tire of the present invention may offer an excellent wet performance.

Figure 18A:
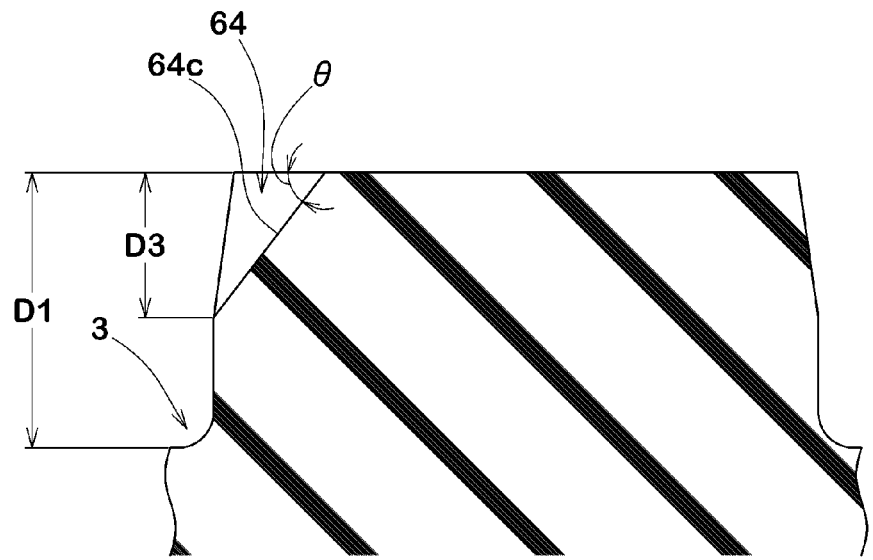
FIG. 18A is a cross-sectional view of the middle block taken along lines B-B of FIG. 17.

FIG. 18A illustrates a cross-sectional view taken along lines B-B of FIG. 17. As illustrated in FIG. 18A, in order to further improve the advantageous effect, the angle θ of the slope 64*c* relative to the ground contact surface is preferably in a range of not less than 45 degrees, more preferably not less than 50 degrees, but preferably in a range of not more than 70 degrees, more preferably not more than 60 degrees.

Figure 18B:
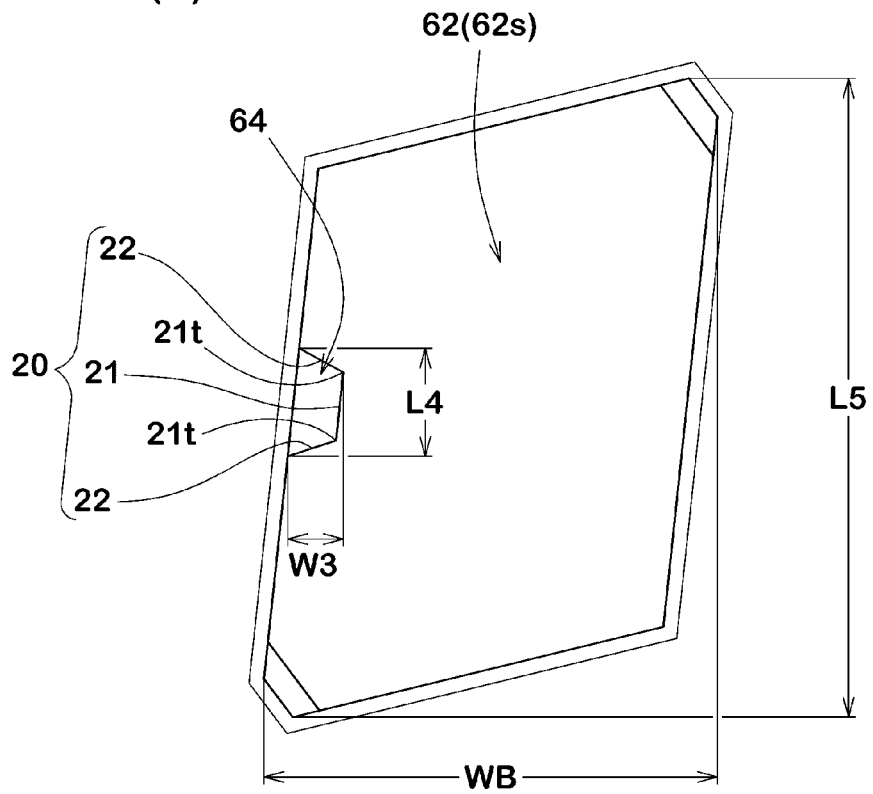
FIG. 18B is an enlarged plan view of a ground contact surface of the middle block of FIG. 17.

FIG. 18B illustrates an enlarged plan view of the ground contact surface 62*s* of a middle block 62 of FIG. 17. As illustrated in FIG. 5B, the inclined slot 64 includes an opening edge 20 on the ground contact surface 62*s*. The opening edge 20 includes a circumferential first edge 21 and a pair of second edges 22 extending outwardly of the block from both ends 21*t* of the first edge 21. The second edges 22 and 22 are inclined in an opposite direction each other so that the circumferential width of the opening edge 20 increases toward outside of the block. The inclined slot 64 may guide the water which is pushed out by the ground contact surface of the middle block 62 effectively toward the central main groove when traveling on wet road.

As illustrated in FIG. 17, the inclined slot 64, for example, includes a pair of slot sidewalls 64e each of which extends from each second edge 22 to the bottom 64d of the inclined slot 64 between the block sidewall 62t and the slope 64c. The slot sidewalls 64e is formed as a plane having an approximately a triangular shape, for example.

As illustrated in FIG. 18B, the circumferential length L4 of the inclined slot 64 is preferably not less than 0.08 times of the circumferential maximal length L5 of the middle block 62, more preferably not less than 0.1 times, but preferably not more than 0.16 times, more preferably not more than 0.14 times. The inclined slot 64 may improve wear resistance of the middle blocks 62 while ensuring its circumferential rigidity.

In the same point of view, the length L4 of the inclined slot 64 is preferably greater than the axial width W3 of the inclined slot 64. A ratio W3/L4 of the width W3 to the length L4 of the inclined slot 64 is preferably not less than 0.65, more preferably not less than 0.68, but preferably not more than 0.75, more preferably not more than 0.72.

Preferably, the width W3 of the inclined slot 64 is not less than 0.08 times of the axial width WB of the middle block 62, more preferably not less than 0.11 times, but preferably not more than 0.17 times, more preferably not more than 0.14 times. Such an inclined slot 64 may offer an excellent steering stability while improving wet performance and wear resistance.

As illustrated in FIG. 18A, the maximal depth D3 of the inclined slot 64 in the radial direction is preferably greater than the width W3 (shown in FIG. 18B) of the inclined slot 64. The maximal depth D3 of the inclined slot 64 is preferably not less than 0.45 times of the depth D1 of the central main groove 3, more preferably not less than 0.48 times, but preferably not more than 0.55 times, more preferably not more than 0.52 times. Such an inclined slot 64 may improve wet performance and wear resistance in good balance.

Figure 19:
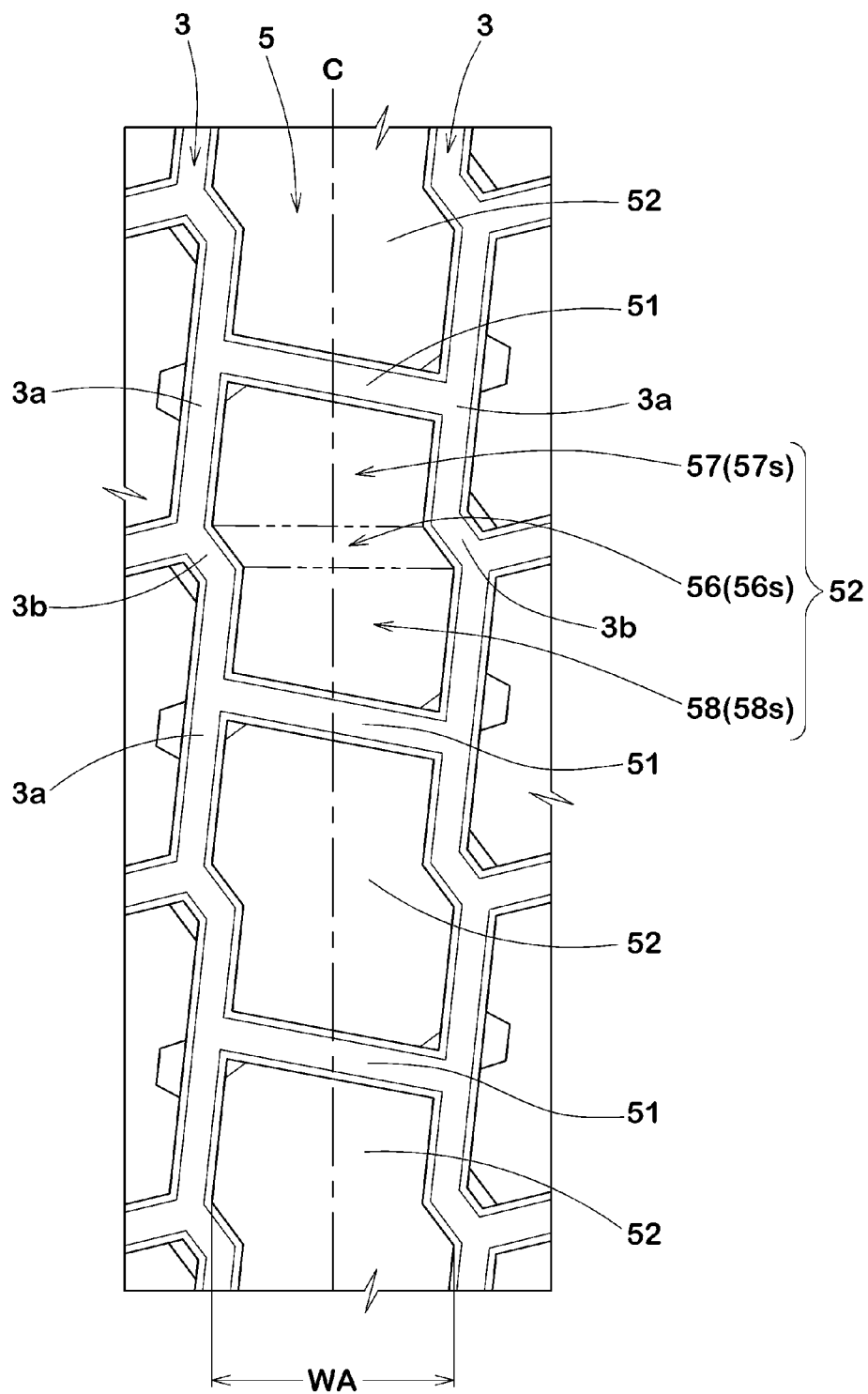
FIG. 19 is an enlarged view of the central land portion of FIG. 14.

FIG. 19 illustrates an enlarged view of the central land portion 5. Each of the central blocks 52 includes a first portion 56 formed between a pair of the short sides 3b and 3b of the central main grooves 3, a second portion 57 located on one side of the first portion 56 in the circumferential direction of the tire, and a third portion 58 located on the other side of the first portion 56 in the circumferential direction of the tire.

The first portion 56 has a ground surface area 56s in an approximately parallelogram shape.

The second portion 57 and the third portion 58 have ground contact surface areas 57s and 58s in an approximately trapezoidal shape. The ground contact surface area 57s of the second portion 57 has substantially the same shape as the ground contact surface area 58 of the third portion 58. The second portion 57 is located in different position to the third portion 58 in the axial direction of the tire. Such a central block 52 may increase traction on wet and snow conditions.

Figure 20:
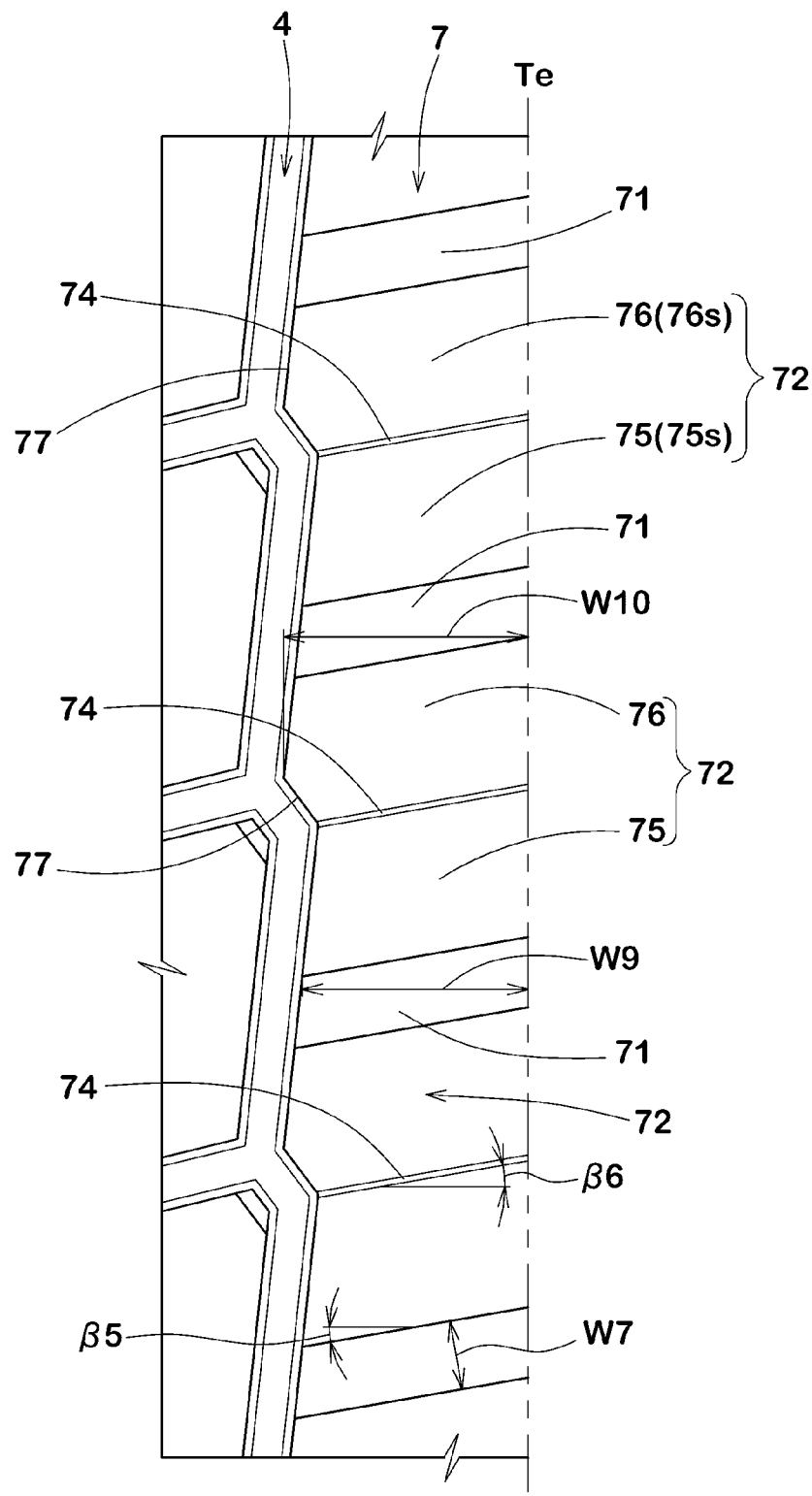
FIG. 20 is an enlarged view of the shoulder land portion of FIG. 14.

FIG. 20 illustrates an enlarged view of the shoulder land portion 7. The shoulder lateral grooves 71, for example, extend from the shoulder main groove 4 to the tread edge Te. The shoulder lateral grooves 71, for example, are inclined in the same direction as the middle lateral grooves 61 (shown in FIG. 1). The angles β5 of the shoulder lateral grooves 71, for example, are in a range of from 5 to 15 degrees relative to the axial direction of the tire. The widths W7 of the shoulder lateral grooves 71 are in a range of from 8 to 12 mm, for example.

As illustrated in FIG. 15, the depths D7 of the shoulder lateral grooves 71, for example, are in a range of from 0.15 to 0.20 times of the depth D2 of the shoulder main groove 4. Such a shoulder lateral groove 71 may offer an excellent steering stability by enhancing rigidity of the shoulder land portion 7.

As illustrated in FIG. 20, the shoulder blocks 72, for example, includes a first shoulder block piece 75 and a second shoulder block piece 76 which are separated by a shoulder lateral sipe 74 that extends straightly from the shoulder main groove 4 to the tread edge Te.

The first shoulder block piece 75 has an approximately trapezoidal ground contact surface 75s. The axial width W9 of the first shoulder block piece 75, for example, is in a range of from 0.12 to 0.18 times of the tread width TW.

The second shoulder block piece 76 has an approximately pentagonal ground contact surface 76s that includes an axially inner edge 77 protruding axially inwardly. The axial width W10 of the second shoulder block piece 76 is greater than the width W9 of the first shoulder block piece 75. Such a second shoulder block piece 76 may improve steering stability by enhancing axial rigidity of the shoulder blocks 72.

In order to further improve the advantageous effect, a ratio W9/W10 of the width W9 of the first shoulder block piece 75 to the width W10 of the second shoulder block piece 76 is preferably not less than 0.85, more preferably not less than 0.87, but preferably not more than 0.95, more preferably not more than 0.93.

The shoulder lateral sipes 74, for example, are inclined in the same direction as the shoulder lateral grooves 71. The angles β6 of the shoulder lateral sipes 74 are in a range of 5 to 15 degrees relative to the axial direction of the tire, for example. Such a shoulder lateral sipe 74 may suppress uneven wear on the shoulder blocks 72 by uniformizing the ground contact pressure acted hereon.

While the embodiments in accordance with the present invention have been described in detail, the present invention is not limited to the illustrated embodiments, but can be modified and carried out in various aspects.

EXAMPLE

Heavy-duty tires having a tire size of 215/75R17.5 and a basic structure illustrated in FIG. 1 were manufactured based on the detail shown in Table 1. Then, wet performance and uneven wear resistance were tested. The test procedures are as follows.

Wet Performance:

Each test tire was installed to all the wheels of a truck having maximum carrying capacity of 4 tons (2-D). Then, the test truck was driven on a circular course of an asphalt road covered with water of 1.4 to 1.6 mm depth, and the average lateral acceleration for the speed range of from 70 to 90 km/h was measured while increasing the speed of the truck in stage. The results are indicated using an index based on Ex. 1 being 100. The larger the value, the better the wet performance is.

Uneven Wear Resistance:

After the truck traveled for 10,000 km at a constant load, remaining groove depths of the central main grooves and the shoulder main grooves were measured. Then uneven wear amount of the tread portion was calculated based on these remaining depths of the main grooves. The results are indicated using an index based on Ex. 1 being 100. The larger the value, the better the uneven wear resistance is.

TABLE 1

|  | Ex. 1 | Ex. 2 | Ex. 3 | Ex. 4 | Ex. 5 |
| --- | --- | --- | --- | --- | --- |
| Inclined slot | Presence | Presence | Presence | Presence | Presence |

TABLE 1-continued

|  | | | | | |
|---|---|---|---|---|---|
| L1/L2 (%) | 34 | 20 | 25 | 50 | 55 |
| L3/W1 (%) | 60 | 60 | 60 | 60 | 60 |
| D3/D1 (%) | 60 | 60 | 60 | 60 | 60 |
| WB/WA (%) | 100 | 100 | 100 | 100 | 100 |
| WC/WA (%) | 100 | 100 | 100 | 100 | 100 |
| Land ratio (%) | 70 | 70 | 70 | 70 | 70 |
| θ (deg.) | 60 | 60 | 60 | 60 | 60 |
| Wet performance (Index) | 100 | 93 | 98 | 95 | 90 |
| Uneven wear resistance (Index) | 100 | 100 | 100 | 100 | 100 |

|  | Ex. 6 | Ex. 7 | Ex. 8 | Ex. 9 | Ex. 10 |
|---|---|---|---|---|---|
| Inclined slot | Presence | Presence | Presence | Presence | Presence |
| L1/L2 (%) | 34 | 34 | 34 | 34 | 34 |
| L3/W1 (%) | 50 | 55 | 65 | 70 | 60 |
| D3/D1 (%) | 60 | 60 | 60 | 60 | 45 |
| WB/WA (%) | 100 | 100 | 100 | 100 | 100 |
| WC/WA (%) | 100 | 100 | 100 | 100 | 100 |
| Land ratio (%) | 70 | 70 | 70 | 70 | 70 |
| θ (deg.) | 60 | 60 | 60 | 60 | 60 |
| Wet performance (Index) | 90 | 95 | 105 | 110 | 90 |
| Uneven wear resistance (Index) | 110 | 105 | 95 | 90 | 110 |

|  | Ex. 11 | Ex. 12 | Ex. 13 | Ex. 14 | Ex. 15 |
|---|---|---|---|---|---|
| Inclined slot | Presence | Presence | Presence | Presence | Presence |
| L1/L2 (%) | 34 | 34 | 34 | 34 | 34 |
| L3/W1 (%) | 60 | 60 | 60 | 60 | 60 |
| D3/D1 (%) | 50 | 100 | 60 | 60 | 60 |
| WB/WA (%) | 100 | 100 | 100 | 100 | 100 |
| WC/WA (%) | 100 | 100 | 100 | 100 | 100 |
| Land ratio (%) | 70 | 70 | 70 | 70 | 70 |
| θ (deg.) | 60 | 60 | 45 | 50 | 70 |
| Wet performance (Index) | 95 | 110 | 90 | 95 | 105 |
| Uneven wear resistance (Index) | 100 | 90 | 110 | 105 | 95 |

|  | Ex. 16 | Ref. 1 |
|---|---|---|
| Inclined slot | Presence | None |
| L1/L2 (%) | 34 | 0 |
| L3/W1 (%) | 60 | 0 |
| D3/D1 (%) | 60 | 0 |
| WB/WA (%) | 100 | 100 |
| WC/WA (%) | 100 | 100 |
| Land ratio (%) | 70 | 70 |
| θ (deg.) | 75 | 0 |
| Wet performance (Index) | 110 | 70 |
| Uneven wear resistance (Index) | 90 | 110 |

As it is clear from Table 1, it is confirmed that the heavy-duty tires in accordance with the examples improve wet performance effectively while improving wear resistance and uneven wear resistance as compared with comparative examples.

Heavy-duty tires having a tire size of 215/75R17.5 and a basic structure illustrated in FIG. 8 were manufactured based on the detail shown in Table 2. Then, wet performance and uneven wear resistance were tested. The test procedures are as follows.

Wet Performance:

Each test tire was installed to the rear wheels of a truck loaded with a half load of maximum carrying capacity of 4 tons (2-D) using a rim of 17.5×6.00 with an inner pressure of 700 kPa. Then, a test driver started the truck using the second gear position by engaging its clutch at the timing of a 1,500 rpm engine speed on a wet asphalt road covered with water of 5 mm deep, and measured the time for traveling to 10 m distance. The test results were evaluated as the reciprocal of the time and were indicated using an index based on Ex. 1 being 100. The larger the value, the better the wet performance is.

Uneven Wear Resistance:

The tire of Ex. 1 was installed in one side of the rear wheels of the above mentioned truck, and the other test tire was installed in the other side of the rear wheels, and then the test truck was traveled on a standard road until either one of the tires wears down at 50%. After traveling, condition of uneven wear was checked by naked eyes. The test results are indicated using a score based on Ex. 1 being 5. The larger the value, the better the uneven wear resistance is.

TABLE 2

|  | Ex. 1 | Ex. 2 | Ex. 3 | Ex. 4 | Ex. 5 |
|---|---|---|---|---|---|
| Inclined slot | Presence | Presence | Presence | Presence | Presence |
| L1/L2 (%) | 34 | 20 | 25 | 50 | 55 |
| L3/W1 (%) | 60 | 60 | 60 | 60 | 60 |
| D3/D1 (%) | 60 | 60 | 60 | 60 | 60 |
| WB/WA (%) | 100 | 100 | 100 | 100 | 100 |
| WC/WA (%) | 100 | 100 | 100 | 100 | 100 |
| Land ratio (%) | 70 | 70 | 70 | 70 | 70 |
| θ (deg.) | 60 | 60 | 60 | 60 | 60 |
| Wet performance (Index) | 100 | 93 | 98 | 95 | 90 |
| Uneven wear resistance (Index) | 100 | 100 | 100 | 100 | 100 |

|  | Ex. 6 | Ex. 7 | Ex. 8 | Ex. 9 | Ex. 10 |
|---|---|---|---|---|---|
| Inclined slot | Presence | Presence | Presence | Presence | Presence |
| L1/L2 (%) | 34 | 34 | 34 | 34 | 34 |
| L3/W1 (%) | 50 | 55 | 65 | 70 | 60 |
| D3/D1 (%) | 60 | 60 | 60 | 60 | 45 |
| WB/WA (%) | 100 | 100 | 100 | 100 | 100 |
| WC/WA (%) | 100 | 100 | 100 | 100 | 100 |
| Land ratio (%) | 70 | 70 | 70 | 70 | 70 |
| θ (deg.) | 60 | 60 | 60 | 60 | 60 |
| Wet performance (Index) | 90 | 95 | 105 | 110 | 90 |
| Uneven wear resistance (Index) | 110 | 105 | 95 | 90 | 110 |

|  | Ex. 11 | Ex. 12 | Ex. 13 | Ex. 14 | Ex. 15 |
|---|---|---|---|---|---|
| Inclined slot | Presence | Presence | Presence | Presence | Presence |
| L1/L2 (%) | 34 | 34 | 34 | 34 | 34 |
| L3/W1 (%) | 60 | 60 | 60 | 60 | 60 |
| D3/D1 (%) | 50 | 100 | 60 | 60 | 60 |
| WB/WA (%) | 100 | 100 | 100 | 100 | 100 |
| WC/WA (%) | 100 | 100 | 100 | 100 | 100 |
| Land ratio (%) | 70 | 70 | 70 | 70 | 70 |
| θ (deg.) | 60 | 60 | 45 | 50 | 70 |
| Wet performance (Index) | 95 | 110 | 90 | 95 | 105 |
| Uneven wear resistance (Index) | 100 | 90 | 110 | 105 | 95 |

|  | Ex. 16 | Ref. 1 |
|---|---|---|
| Inclined slot | Presence | None |
| L1/L2 (%) | 34 | 0 |
| L3/W1 (%) | 60 | 0 |
| D3/D1 (%) | 60 | 0 |
| WB/WA (%) | 100 | 100 |
| WC/WA (%) | 100 | 100 |
| Land ratio (%) | 70 | 70 |
| θ (deg.) | 75 | 0 |
| Wet performance (Index) | 110 | 70 |
| Uneven wear resistance (Index) | 90 | 110 |

As it is clear from Table 2, it has been confirmed that the heavy-duty tires in accordance with the examples improve wet performance effectively without deteriorating uneven wear resistance as compared with comparative examples.

Figure 21:
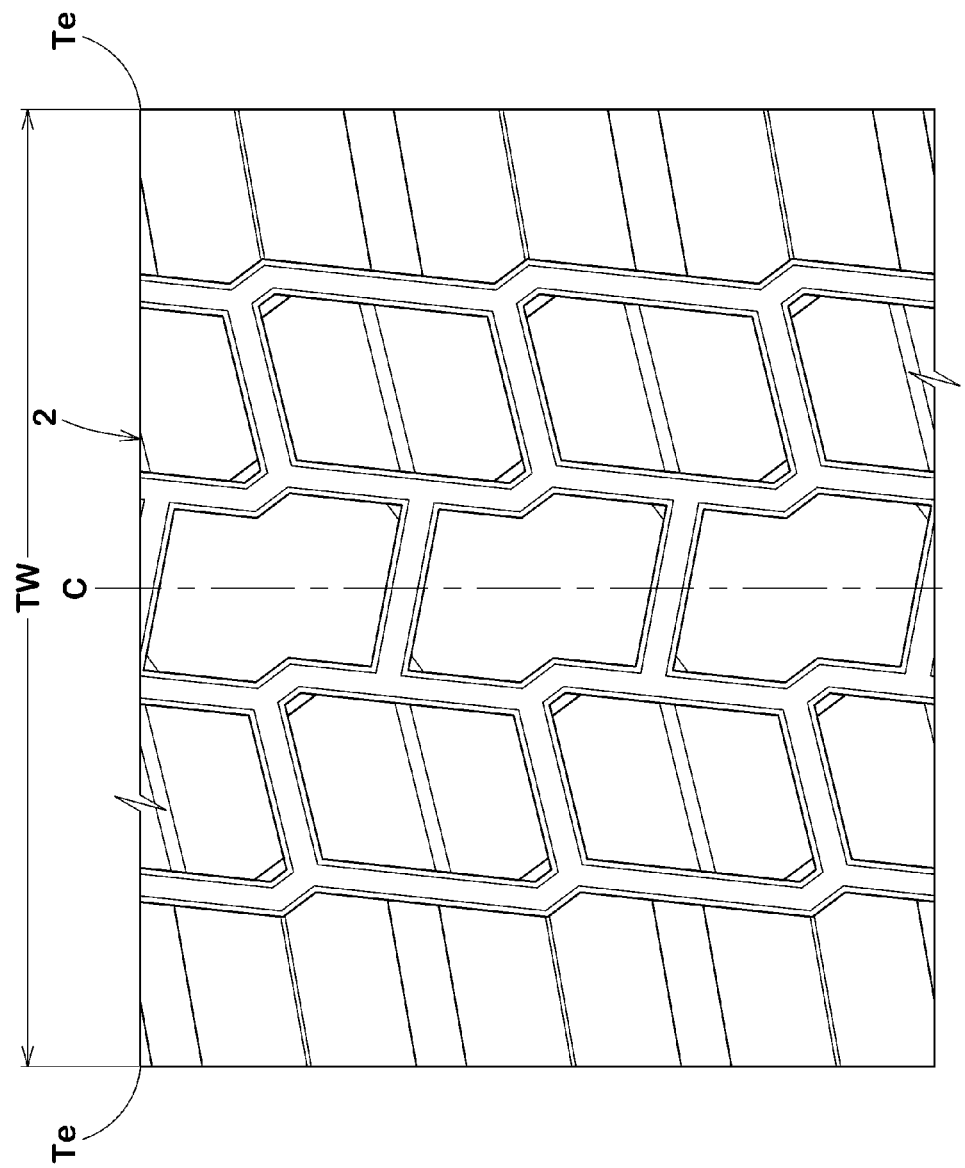
FIG. 21 is a development view of the tread portion of Comparative Example 1.

Heavy-duty tires having a tire size of 215/75R17.5 and a basic structure illustrated in FIG. 14 were manufactured based on the detail shown in Table 3. As Ref. 1, the tire having middle blocks each of which is provided with a middle narrow-groove extending across the block, as illustrated in FIG. 21, was manufactured. As Ref. 2, the tire having middle blocks each of which is not provided any slots, as illustrated in FIG. 22, was manufactured. Then, wet performance and wear resistance of each tire was tested. The common specifications of tires and test procedures are as follows.

Rim: 6.0×17.5
Tire inner pressure: 700 kPa
Tire installing position: Rear wheels (drive wheels)
Test vehicle: Truck loaded with a half load of maximum carrying capacity of 4 tons at front side of platform Wear Resistance The test truck was traveled on a standard road for a certain distance. After traveling, remaining groove depths of the central main grooves were measured. The results are indicated using an index based on Ref. 1 being 100. The larger the value, the better the wear resistance is.

Wet Performance

Using the test vehicle, passing time when the vehicle passes through the test course of full length 10 m under the following conditions was measured. The test results were evaluated as the reciprocal of the time and were indicated using an index based on Ref. 1 being 100. The larger the value, the better the wet performance is. Here, the road condition is an asphalt road covered with water of 5 mm deep, and the test vehicle was started to run by connecting clutch in the second gear with 1500 rpm engine speed fixed.

Test results are shown in Table 3.

4 Shoulder main groove
51 Central lateral groove
52 Central block
53 Row of central blocks
61 Middle lateral groove
62 Middle block
63 Row of middle blocks
64 Inclined slot
64a Opening
64b End
64c Slope
71 Shoulder lateral groove
72 Shoulder block
73 Row of shoulder blocks

The invention claimed is:

1. A heavy-duty tire comprising:
a tread portion being provided with a pair of circumferentially and continuously extending zigzag central main grooves arranged on both sides of a tire equator, a pair of circumferentially and continuously extending zigzag shoulder main grooves each arranged between one of the central main grooves and one of tread edges, a plurality of central lateral grooves connecting the pair of central main grooves and a plurality of middle lateral grooves connecting the central main groove with the shoulder main groove on both sides of the tire equator, thereby the tread portion comprising a central land portion in which a plurality of central blocks separated by the pair of central main grooves and the central lateral grooves are arranged in a circumferential direction of the tire, a pair of middle land portions in which a plurality of middle blocks separated by one of the central main grooves, one of the shoulder main grooves and the middle lateral grooves are arranged in the circumferential direction of the tire, and a pair of shoulder land portions separated between one of the shoulder main grooves and one of the tread edges;
each of the central main grooves and the shoulder main grooves comprising long sides and short sides arranged alternately in the circumferential direction of the tire

TABLE 3

| | Ref. 1 | Ref. 2 | Ex. 1 | Ex. 2 | Ex. 3 | Ex. 4 | Ex. 5 | Ex. 6 | Ex. 7 |
|---|---|---|---|---|---|---|---|---|---|
| Tread pattern | FIG. 8 | FIG. 9 | FIG. 1 | FIG. 1 | FIG. 1 | FIG. 1 | FIG. 1 | FIG. 1 | FIG. 1 |
| Slot | None | None | Presence | Presence | Presence | Presence | Presence | Presence | Presence |
| Slot length L1 (mm) | — | — | 5.5 | 3 | 4 | 6.5 | 8 | 5.5 | 5.5 |
| Slot width W1 (mm) | — | — | 3.8 | 3.8 | 3.8 | 3.8 | 3.8 | 2.6 | 3.2 |
| Slot maximum depth d1 (mm) | — | — | 8 | 8 | 8 | 8 | 8 | 8 | 8 |
| Slot length L1/middle block length L6 | — | — | 0.12 | 0.07 | 0.09 | 0.14 | 0.18 | 0.12 | 0.12 |
| Slot width W1/middle block width W7 | — | — | 0.12 | 0.12 | 0.12 | 0.12 | 0.12 | 0.08 | 0.1 |
| Slot length W1/slot length L1 | — | — | 0.69 | 1.27 | 0.95 | 0.58 | 0.48 | 0.47 | 0.58 |
| Slot maximum depth d1/central main groove depth d3 | — | — | 0.52 | 0.52 | 0.52 | 0.52 | 0.52 | 0.52 | 0.52 |
| Wear resistance (Index) | 100 | 108 | 107 | 107 | 107 | 106 | 104 | 107 | 107 |
| Wet performance (Index) | 100 | 90 | 98 | 96 | 97 | 99 | 99 | 96 | 97 |

| | Ex. 8 | Ex. 9 | Ex. 10 | Ex. 11 | Ex. 12 | Ex. 13 | Ex. 14 | Ex. 15 |
|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 |
| Slot | Presence | Presence | Presence | Presence | Presence | Presence | Presence | Presence |
| Slot length L1 (mm) | 5.5 | 5.5 | 5.5 | 5.5 | 5.5 | 5.5 | 5.5 | 5.5 |
| Slot width W1 (mm) | 4.8 | 5.4 | 3.8 | 3.8 | 3.8 | 3.8 | 3.6 | 4.1 |
| Slot maximum depth d1 (mm) | 8 | 8 | 5.5 | 6.5 | 9 | 10 | 8 | 8 |
| Slot length L1/middle block length L6 | 0.12 | 0.12 | 0.12 | 0.12 | 0.12 | 0.12 | 0.12 | 0.12 |
| Slot width W1/middle block width W7 | 0.15 | 0.17 | 0.12 | 0.12 | 0.12 | 0.12 | 0.12 | 0.12 |
| Slot length W1/slot length L1 | 0.87 | 0.98 | 0.69 | 0.69 | 0.69 | 0.69 | 0.65 | 0.75 |
| Slot maximum depth d1/central main groove depth d3 | 0.52 | 0.52 | 0.35 | 0.42 | 0.58 | 0.65 | 0.52 | 0.52 |
| Wear resistance (Index) | 105 | 103 | 107 | 107 | 107 | 104 | 107 | 107 |
| Wet performance (Index) | 98 | 99 | 96 | 97 | 98 | 98 | 98 | 98 |

From the test results, it is confirmed that the example tires offer an excellent wet performance and wear resistance.

REFERENCE SIGNS LIST

2 Tread portion
3 Central main groove wherein the short sides are inclined in an opposite direction to the long sides and have circumferential lengths shorter than that of the long sides, and wherein the long sides are inclined at angles of from 3 to 9 degrees with respect to the circumferential direction of the tire;

each central lateral groove connecting the long sides of the pair of central main grooves;

each middle lateral groove connecting an outer zigzag corner of said one of the central main grooves with an inner zigzag corner of said one of the shoulder main grooves, wherein the outer zigzag corner protrudes toward the tread edge, and wherein the inner zigzag corner protrudes toward the tire equator;

the middle blocks each being provided with an inclined slot on a location facing one of the central lateral grooves through said one of the central main grooves, wherein the inclined slot has a depth increasing gradually toward said one of the central main grooves; and the inclined slot having an opening edge on a ground contact surface of the middle block such that the opening edge is not communicating with a pair of middle lateral grooves arranged on circumferentially both sides of the middle block, the opening edge comprising a circumferential first edge and a pair of second edges extending from both ends of the first edge to said one of the central main grooves, wherein each one of the pair of second edges is inclined in an opposite direction from each other so that a circumferential width of the opening edge increases toward said one of the main grooves from the first edge.

2. The heavy-duty tire according to claim 1,
wherein the inclined slot overlaps with an opening of said one of the central lateral grooves in a circumferential region of from 25% to 50% of a circumferential length of said one of the central lateral grooves.

3. The heavy-duty tire according to claim 1,
wherein the inclined slot extends from said one of the central main grooves toward the shoulder main groove and terminates at an end without reaching said one of the shoulder main grooves, and a length of the inclined slot from an opening facing the central main groove to the end is in a range of from 55% to 65% of a width of said one of the central main grooves.

4. The heavy-duty tire according to claim 1,
wherein a plurality of shoulder lateral grooves connecting said one of the shoulder main grooves with said one of the tread edges are provided on each shoulder land portion to form a row of circumferentially arranged plurality of shoulder blocks each of which is defined by said one of the shoulder main grooves, said one of the tread edges and a pair of shoulder lateral grooves.

5. The heavy-duty tire according to claim 4,
wherein the shoulder blocks each have an axial length in a range of from 95% to 105% of an axial length of the central blocks.

6. The heavy-duty tire according to claim 1,
wherein the inclined slot comprises a slope inclined radially inwardly from a ground contact surface of the middle block, and an angle formed between the slope and the ground contact surface of the middle block that opens to said one of the central main grooves is in a range of from 50 to 70 degrees.

7. The heavy-duty tire according to claim 1,
wherein the middle lateral grooves each are inclined at an angle with respect to an axial direction of the tire, and the central lateral grooves each are inclined in an opposite direction to the middle lateral grooves.

8. The heavy-duty tire according to claim 1,
wherein the central main grooves have an axial zigzag-amplitude W12 in a range of from 10% to 18% of an axial length WA of the central blocks.

9. The heavy-duty tire according to claim 1, wherein the tread portion has a land ratio in a range of not less than 65%.

10. The heavy-duty tire according to claim 9, wherein the tread portion has a land ratio in a range of not more than 75%.

11. The heavy-duty tire according to claim 1,
wherein a maximal depth D3 of the inclined slot is greater than an axial length W3 of the inclined slot.

12. The heavy-duty tire according to claim 1,
wherein a circumferential length L4 of the inclined slot is greater than an axial length W3 of the inclined slot.

13. The heavy-duty tire according to claim 1,
wherein a circumferential length of the inclined slot is in a range of from 0.08 to 0.16 times a circumferential maximal length of the middle block.

14. The heavy-duty tire according to claim 13,
wherein the inclined slot comprises a pair of slot sidewalls and a slope between the pair of sidewalls,
the slope extends from the first edge to a bottom of the inclined slot, and
each one of the pair of slot sidewalls extends from said one of the pair of second edges to the slope and has a triangular shape manner.

15. The heavy-duty according to claim 14,
wherein the slope is formed in a planar shape from the first edge to the bottom.

16. The heavy-duty tire according to claim 7,
wherein each of the central lateral grooves extends in a straight manner without bending.

17. The heavy-duty tire according to claim 15,
wherein each of the central lateral grooves extends in a straight manner without pending.

18. The heavy-duty tire according to claim 1, wherein
the shoulder main grooves comprise outer zigzag corners protruding axially outwardly and zigzag inner corners protruding axially inwardly, and
on each side of the tire equator, the middle lateral grooves are connected to the inner zigzag corners of the shoulder main groove without communicating with the outer corners of the shoulder main grooves.

19. A heavy-duty tire comprising:
a tread portion being provided with a pair of circumferentially and continuously extending zigzag central main grooves arranged on both sides of a tire equator, a pair of circumferentially and continuously extending zigzag shoulder main grooves each arranged between one of the central main grooves and one of tread edges, a plurality of central lateral grooves connecting the pair of central main grooves and a plurality of middle lateral grooves connecting the central main groove with the shoulder main groove on both sides of the tire equator, thereby the tread portion comprising a central land portion in which a plurality of central blocks separated by the pair of central main grooves and the central lateral grooves are arranged in a circumferential direction of the tire, a pair of middle land portions in which a plurality of middle blocks separated by one of the central main grooves, one of the shoulder main grooves and the middle lateral grooves are arranged in the circumferential direction of the tire, and a pair of shoulder land portions separated between one of the shoulder main grooves and one of the tread edges;

each of the central main grooves and the shoulder main grooves comprising long sides and short sides arranged alternately in the circumferential direction of the tire wherein the short sides are inclined in an opposite direction to the long sides and have circumferential lengths shorter than that of the long sides;

each central lateral groove connecting the long sides of the pair of central main grooves;

each middle lateral groove connecting an outer zigzag corner of said one of the central main grooves with an inner zigzag corner of said one of the shoulder main grooves, wherein the outer zigzag corner protrudes toward the tread edge, and wherein the inner zigzag corner protrudes toward the tire equator;

the middle blocks each being provided with an inclined slot on a location facing one of the central lateral grooves through said one of the central main grooves, wherein the inclined slot has a depth increasing gradually toward said one of the central main grooves, and wherein a maximal depth D3 of the inclined slot is greater than an axial length W3 of the inclined slot; and the inclined slot having an opening edge on a ground contact surface of the middle block such that the opening edge is not communicated with a pair of middle lateral grooves arranged on circumferentially both sides of the middle block, the opening edge comprising a circumferential first edge and a pair of second edges extending from both ends of the first edge to said one of the central main groove, wherein each one of the pair of second edges is inclined in an opposite direction from each other so that a circumferential width of the opening edge increases toward said one of the main groove from the first edge.

20. A heavy-duty tire comprising:

a tread portion being provided with a pair of circumferentially and continuously extending zigzag central main grooves arranged on both sides of a tire equator, a pair of circumferentially and continuously extending zigzag shoulder main grooves each arranged between one of the central main grooves and one of tread edges, a plurality of central lateral grooves connecting the pair of central main grooves and a plurality of middle lateral grooves connecting the central main groove with the shoulder main groove on both sides of the tire equator, thereby the tread portion comprising a central land portion in which a plurality of central blocks separated by the pair of central main grooves and the central lateral grooves are arranged in a circumferential direction of the tire, a pair of middle land portions in which a plurality of middle blocks separated by one of the central main grooves, one of the shoulder main grooves and the middle lateral grooves are arranged in the circumferential direction of the tire, and a pair of shoulder land portions separated between one of the shoulder main grooves and one of the tread edges;

each of the central main grooves and the shoulder main grooves comprising long sides and short sides arranged alternately in the circumferential direction of the tire wherein the short sides are inclined in an opposite direction to the long sides and have circumferential lengths shorter than that of the long sides;

each central lateral groove connecting the long sides of the pair of central main grooves;

each middle lateral groove connecting an outer zigzag corner of said one of the central main grooves with an inner zigzag corner of said one of the shoulder main grooves, wherein the outer zigzag corner protrudes toward the tread edge, and wherein the inner zigzag corner protrudes toward the tire equator;

the middle blocks each being provided with an inclined slot on a location facing one of the central lateral grooves through said one of the central main grooves, wherein the inclined slot has a depth increasing gradually toward said one of the central main grooves and wherein a circumferential length of the inclined slot is in a range of from 0.08 to 0.16 times a circumferential maximal length of the middle block; and the inclined slot having an opening edge on a ground contact surface of the middle block such that the opening edge is not communicated with a pair of middle lateral grooves arranged on circumferentially both sides of the middle block, the opening edge comprising a circumferential first edge and a pair of second edges extending from both ends of the first edge to said one of the central main groove, wherein each one of the pair of second edges is inclined in an opposite direction from each other so that a circumferential width of the opening edge increases toward said one of the main groove from the first edge.

* * * * *